(12) United States Patent
Asandei

(10) Patent No.: US 7,671,140 B2
(45) Date of Patent: Mar. 2, 2010

(54) RING-OPENING POLYMERIZATION OF CYCLIC ESTERS, POLYESTERS FORMED THEREBY, AND ARTICLES COMPRISING THE POLYESTERS

(75) Inventor: Alexandru Dragos Asandei, Vernon, CT (US)

(73) Assignee: The University of Connecticut, Farmington, CT (US)

( * ) Notice: Subject to any disclaimer, the term of this patent is extended or adjusted under 35 U.S.C. 154(b) by 0 days.

(21) Appl. No.: 12/061,909

(22) Filed: Apr. 3, 2008

(65) Prior Publication Data

US 2008/0249255 A1 Oct. 9, 2008

Related U.S. Application Data

(60) Provisional application No. 60/910,675, filed on Apr. 9, 2007.

(51) Int. Cl.
*C08G 63/91* (2006.01)
(52) U.S. Cl. .................. 525/415; 525/410; 525/418; 528/271; 528/354; 528/359; 549/266; 549/263
(58) Field of Classification Search .......... 525/415, 525/410, 418; 528/271, 354, 359; 549/266, 549/263
See application file for complete search history.

(56) References Cited

U.S. PATENT DOCUMENTS 4,624,256 A    11/1986   Messier et al.

| 5,028,667 A * | 7/1991 | McLain et al. ............ 525/415 |
| 6,126,528 A | 10/2000 | Sedlock |
| 6,294,312 B1 | 9/2001 | Grossa |
| 6,790,909 B2 | 9/2004 | Heischkel et al. |
| 2002/0111458 A1* | 8/2002 | Minami et al. ............ 528/272 |
| 2004/0030093 A1* | 2/2004 | Sakurai et al. ............ 528/410 |

FOREIGN PATENT DOCUMENTS

EP    1148074 A2    10/2001
JP    49028279      7/1974

OTHER PUBLICATIONS

Cenac et al., Ring Opening of Lactones and Anhydrides Induced by [Cp2ZrHCl]n, J. Org. Chem. 1996, 61, 796-798.*
Feng et al., Synthesis and Evaluation of Biodegradable Block Copolymers of Caprolactone and Lactide, Journal of Polymer Science: Polymer Letters Edition, vol. 21, 593-600 (1983).*
Buchwald et al., Schwartz's Reagent, Organic Synthesis, Coll. vol. 9, p. 162 (1998); vol. 71, p. 77 (1993).*
Wipf et al., Synthetic Applications of Organochlorozirconocene Complexes, Tetrahedron, vol. 52, No. 40, pp. 12853-12910.*

(Continued)

*Primary Examiner*—Vasu Jagannathan
*Assistant Examiner*—Robert C Boyle
(74) *Attorney, Agent, or Firm*—Cantor Colburn LLP

(57) ABSTRACT

Cyclic esters are polymerized in the presence of a catalytic amount of a Group 4 transition metal hydride. The method is capable of producing high molecular weight polyesters with low polydispersities. These high molecular weight polyesters exhibit improved mechanical properties and are useful in a variety of product applications.

23 Claims, 14 Drawing Sheets

OTHER PUBLICATIONS

Wipf et al., Synthetic Applications of Organochlorozirconocene Complexes, Tetrahedron, vol. 52, No. 40, pp. 12853-12910, 1996.*

Nielsen, Hafnium and Hafnium Compounds, Kirk-Othmer Encyclopedia of Chemical Technology, Jun. 18, 2004.*

Yamashita et al., Organolanthanide-Initiated Living Polymerizations of $\epsilon$-Caprolactone, $\delta$-Vlaerolactone, and $\beta$-Propiolactone, Macromolecules, 1996, 29, 1798-1806.*

Kostakis et al., Ring-Opening Polymerization of Lactones Using Zirconocene Catalytic Systems: Block Copolymerization with Methyl Methacrylate, Journal of Polymer Science: Part A: Polymer Chemistry, 2007, 45, 3524-3537.*

Nathalie Cénac, et al., Ring Opening of Lactones and Anhydrides Induced by [Cp2ZrHCl]n, J. Org. Chem. 1996, 61, pp. 796-798.

Alexandru D. Asandei and Gobinda Saha, Cp2TiCl-catalyzed Epoxide Radical Ring Opening: A New Initiating Methodology for Graft Copolymer Synthesis, Macromolecules, Dec. 1, 2006, Abstract, 1 page.

Alex Asandei, Novel Chemistry of Early Transition Metals for the Synthesis of Complex Polymer Architectures, Grant Proposal to The National Science Foundation, 2005, 27 pages.

Alexandru Asandei et al., TiCp2Cl-Catalyzed Living Radical and Ring Opening Polymerizations Initiated from Epoxides and Aldehydes in the Synthesis of Linear, Graft and Branched Polymers, Mater. Res. Soc. Symp. Proc. vol. 856E © 2005 Materials Research Society.

Hiroki Ebata, Kazunobu Toshima and Shuichi Matsumura, "A Strategy for Increasing Molecular Weight of Polyester by Lipase-Catalyzed Polymerization", Chemistry Letters, vol. 30, No. 8, p. 798, 2001, Abstract.

"Tone P787 Polymer" Available at http://www.dow.com/PublishedLiterature/dh_014c/09002f138014cdc6.pdf?filepath=tone/pdfs/noreg/321-00052.pdf&fromPage=GetDoc (last visited Feb. 9, 2007), 1 page.

U.S. Appl. No. 12/052,947, filed Mar. 21, 2008, Inventor: Alexandru Dragos Asandei.

International Search Report; International Application No. PCT/US2008/004346; International Filing Date Mar. 4, 2008; (6 pages).

Written Opinion of the International Search Report; International Application No. PCT/US2008/004346; International Filing Date Mar. 4, 2008; (7 pages).

Dudev et al., "Ring Strain Energies from ab Initio Calculations", J. Am. Chem. Soc. 1998, 120, 4450-4458.

Bach et al., "The Effect of Carbonyl Substitution on the Strain Energy of Small Ring Compounds and Their Six-Member Ring Reference Compounds", J. Am. Chem. Soc. 2006,128,4598-4611.

M. Szwarc, "Living Polymers. Their Discovery, Characterization, and Properties", Journal of Polymer Science: Part A: Polymer Chemistry, vol. 36, ix-xv (1998).

Szwarc et al., "Polymerization Initiated by Electron Transfer to Monomer. A New Method of Formation of Block Polymers", Journal of the American Chemical Society, 1956, vol. 78, pp. 2656-2657.

M. Szwarc, "Living Polymers", Nature, 1956, vol. 178, pp. 1168-1169.

* cited by examiner

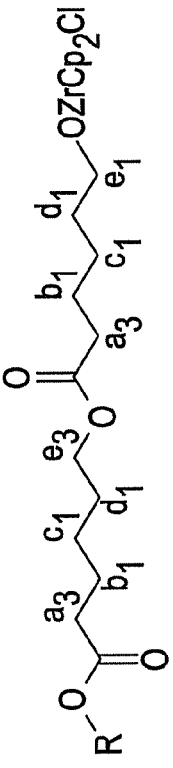
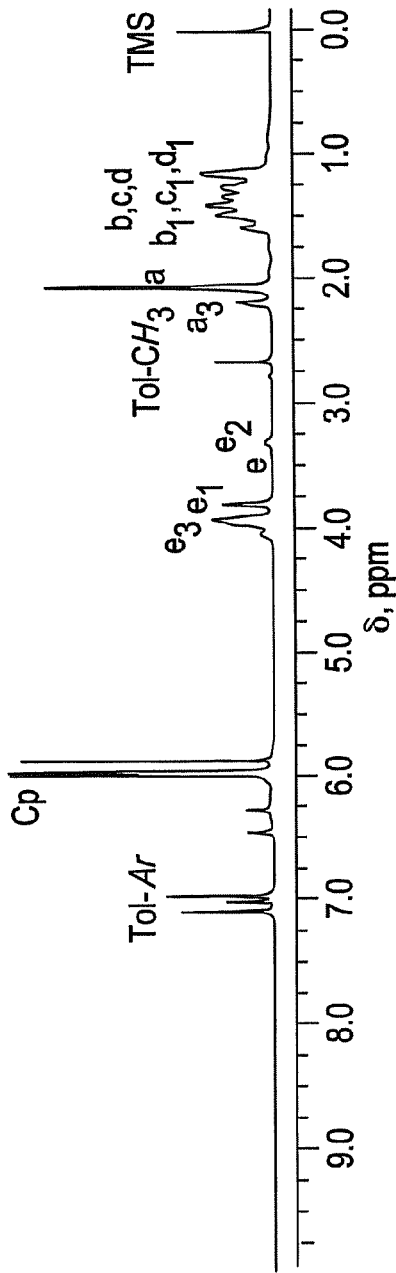
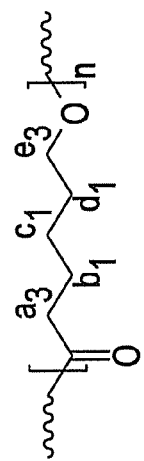
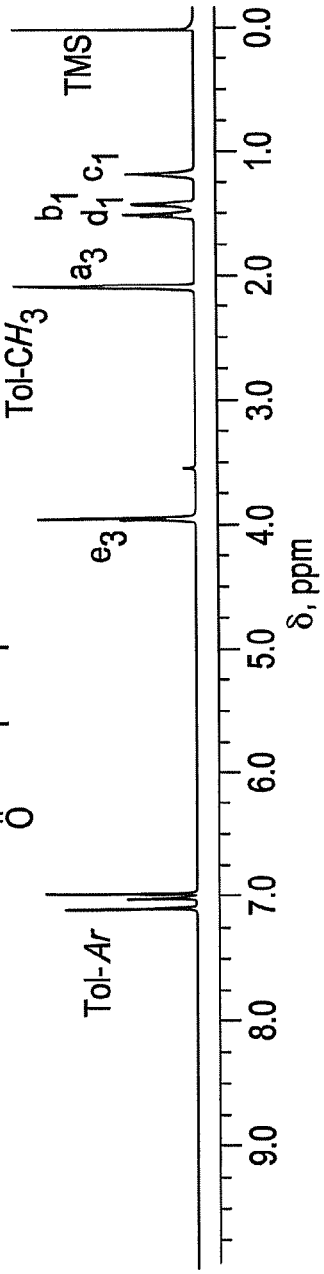
FIG. 5C
FIG. 5D

PCL Chain End derived from the Hydrozirconation of Benzaldehyde

RING-OPENING POLYMERIZATION OF CYCLIC ESTERS, POLYESTERS FORMED THEREBY, AND ARTICLES COMPRISING THE POLYESTERS

CROSS REFERENCE TO RELATED APPLICATION

This application claims the benefit of U.S. Provisional Patent Application Ser. No. 60/910,675 filed Apr. 9, 2007, which is fully incorporated herein by reference.

STATEMENT REGARDING FEDERALLY SPONSORED RESEARCH & DEVELOPMENT

The U.S. Government has certain rights in this invention pursuant to National Science Foundation CHEMISTRY— Organic Synthesis: Methodology and Organometallic, Grant No. CHEM-0518247.

BACKGROUND OF THE INVENTION

Polyesters represent a commercially important class of polymers. One route to polyesters is via ring-opening polymerization of cyclic esters. For example, $\epsilon$-caprolactone can by polymerized to polycaprolactone, which is widely used as a biocompatible material for the fabrication of implantable devices. However, known ring-opening polymerization methods typically produce polyesters having relatively low molecular weights. For example, existing polycaprolactones typically have number average molecular weights substantially less than 100,000 atomic mass units. This molecular weight limitation is manifested as a limitation on the mechanical properties of the polymers (including storage modulus, loss modulus, Young's modulus, tensile elongation at break, and melt viscosity), which in turn limits the uses of the polymers. There is therefore a need for improved ring-opening polymerization methods that produce polyesters having higher molecular weights. There is also a need for methods of expediting the breakdown of polymers comprising ester linkages.

BRIEF DESCRIPTION OF THE INVENTION

The above-described and other drawbacks are alleviated by a method of preparing a polyester comprising: polymerizing a cyclic ester in the presence of a catalytic amount of a Group 4 transition metal hydride.

Another embodiment is a method of preparing a polycaprolactone, comprising: polymerizing $\epsilon$-caprolactone in the presence of a catalytic amount of bis(cyclopentadienyl)zirconium(IV) chloride hydride.

Another embodiment is a method of preparing a polyester comprising: reacting a Group 4 transition metal hydride with an oxygen-containing compound selected from the group consisting of aldehydes, ketones, epoxides, peroxides, anhydrides, carboxylic acids, esters, amides, and vinyl ethers to form a Group 4 transition metal alkoxide intermediate; and polymerizing a cyclic ester in the presence of a catalytic amount of the Group 4 transition metal alkoxide intermediate.

Another embodiment is a method of preparing a polyester, comprising: reacting a Group 4 transition metal halide with a silver(I) salt to form a silver halide and a cationic Group 4 transition metal complex; and polymerizing a cyclic ester in the presence of a catalytic amount of the cationic Group 4 transition metal complex.

Another embodiment is a method of preparing a polyester, comprising: reacting a Group 4 transition metal hydride with a compound comprising a carbon-carbon double bond to form a hydrometalated complex; and polymerizing a cyclic ester in the presence of the hydrometalated complex.

Another embodiment is a polycaprolactone having a number average molecular weight of about 100,000 to about 1,000,000 atomic mass units.

Another embodiment is a polycaprolactone having a number average molecular weight of about 100,000 to about 600,000 atomic mass units Another embodiment is a polycaprolactone exhibiting at least one of a storage modulus, G', of at least 10 kilopascals at 90° C. and a shear rate of 0.001 to 1,000 rad/sec; a loss modulus, G", of at least 10 kilopascals at 90° C. and a shear rate of 0.001 to 1,000 rad/sec; a complex modulus, G*, of at least 10 kilopascals at 90° C. and a shear rate of 0.001 to 1,000 rad/sec; a complex shear viscosity, $\eta$, of 10 kilopascals to 10 megapascals at 90° C. and a shear rate of 0.001 to 1,000 rad/sec; a tensile elongation at break of at least 2000% measured at 23° C.; a tensile strength at yield of at least 15 megapascals measured at 23° C.; a modulus of elasticity of at least 100 megapascals measured at 23° C.; a Young's modulus of at least 30 megapascals measured at 23° C.; and an ultimate tensile strength of at least 8 megapascals measured at 23° C.

Another embodiment is a polyester comprising a terminal residue having the structure —OMCp'$_2$X, wherein M is titanium, zirconium, or hafnium; each occurrence of Cp' is independently an unsubstituted or substituted cyclopentadienyl ligand; and X is chloride, bromide, iodide, $C_1$-$C_{12}$ hydrocarbyl, or $C_1$-$C_{12}$ hydrocarbyloxy.

Another embodiment is a polycaprolactone comprising a terminal residue having the structure —OZrCp'$_2$Cl, wherein each occurrence of. Cp' is independently an unsubstituted or substituted cyclopentadienyl ligand.

Another embodiment is a method of depolymerizing a polymer comprising ester linkages, comprising: mixing the polymer comprising ester linkages with a catalytic amount of a Group 4 transition metal hydride to form a mixture; and maintaining the mixture at a temperature and for a time effective to depolymerize the polymer comprising ester linkages.

Another embodiment is a method of depolymerizing a polycaprolactone, comprising: mixing a polycaprolactone and a catalytic amount of bis(cyclopentadienyl)zirconium (chloride)(hydride) to form a mixture; and maintaining the mixture at a temperature of about 0 to about 200° C. for about 1 to about 200 hours.

These and other embodiments, including articles comprising the polyesters, are described in detail below.

DETAILED DESCRIPTION OF THE INVENTION

Figure 1A:
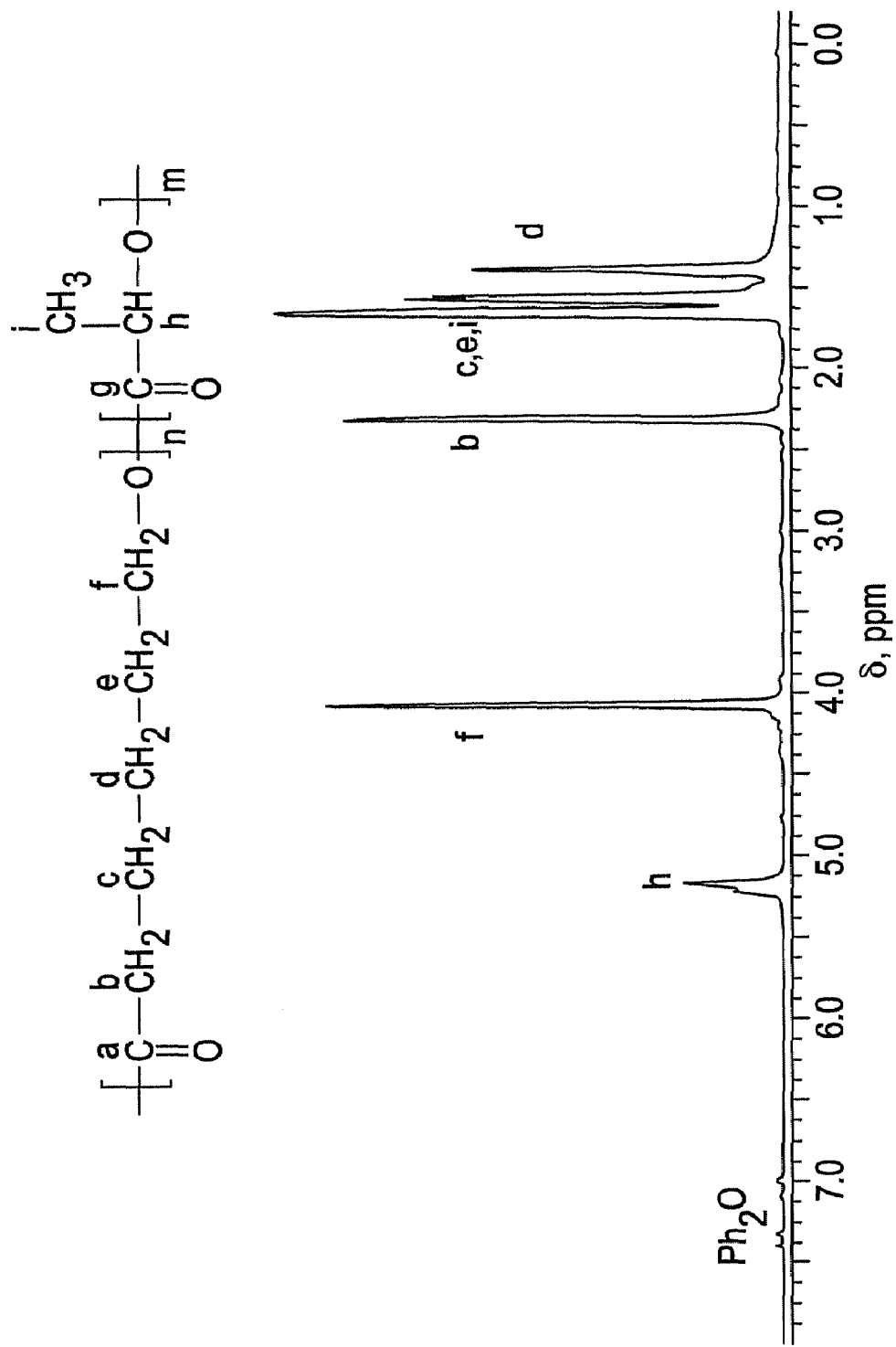
FIG. 1 presents $^1$H NMR (FIG. 1A) and $^{13}$C NMR (FIG. 1C) spectra for a polylactide-polycaprolactone block copolymer, as well as gel permeation chromatographs for a polylactide-polycaprolaclactone block copolymer and a polycaprolactone (FIG. 1B).
Figure 1B:
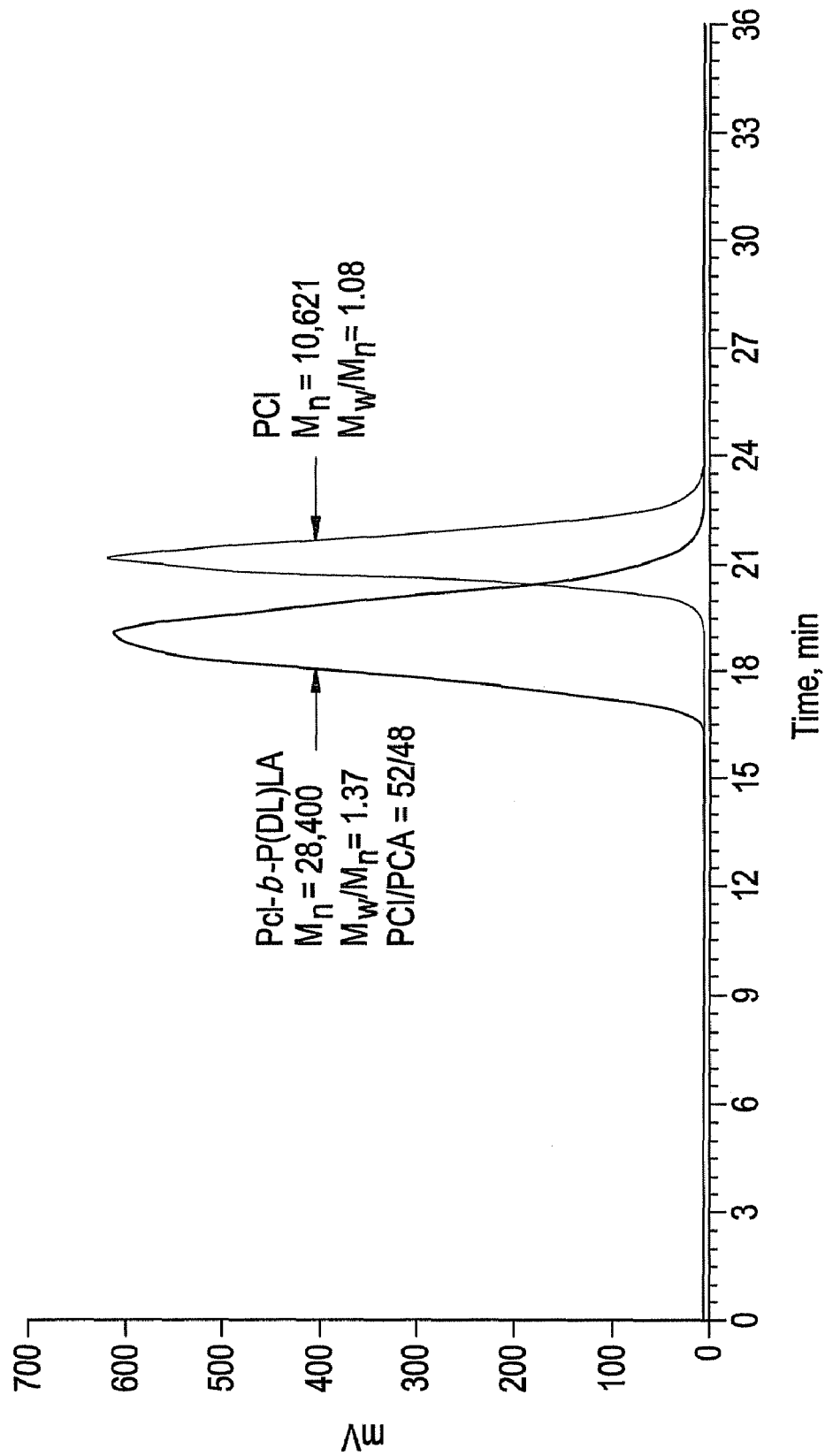

The present inventor has discovered that polyesters, including those having very high molecular weights, can be prepared by ring-opening polymerization of cyclic esters in the presence of a catalytic amount of a Group 4 transition metal hydride. The Group 4 transition metal hydride may be added directly to the polymerization reaction mixture or prepared in situ by reaction of a Group 4 transition metal halide with a suitable hydride reagent. While not wishing to be bound by any particular mechanistic theory, the inventor speculates that that the Group 4 transition metal hydride reacts with a first equivalent of cyclic ester to form a metal alkoxide, which then functions as the catalyst of a living polymerization. For example, as illustrated in Scheme 1 for the polymerization of ε-caprolactone in the presence of bis (cyclopentadienyl)zirconium hydridochloride (Cp$_2$ZrHCl), the hydrozirconation of ε-caprolactone (1) by Cp$_2$ZrHCl (2) produces a transient 2-[(chlorodicyclopentadienylzirconio) oxy]oxepane (3) which isomerizes to form 6-zirconocenechlorideoxyhexanal (HC(O)—(CH$_2$)$_5$—O—ZrCp$_2$Cl) (5) which mediates the chain propagation.

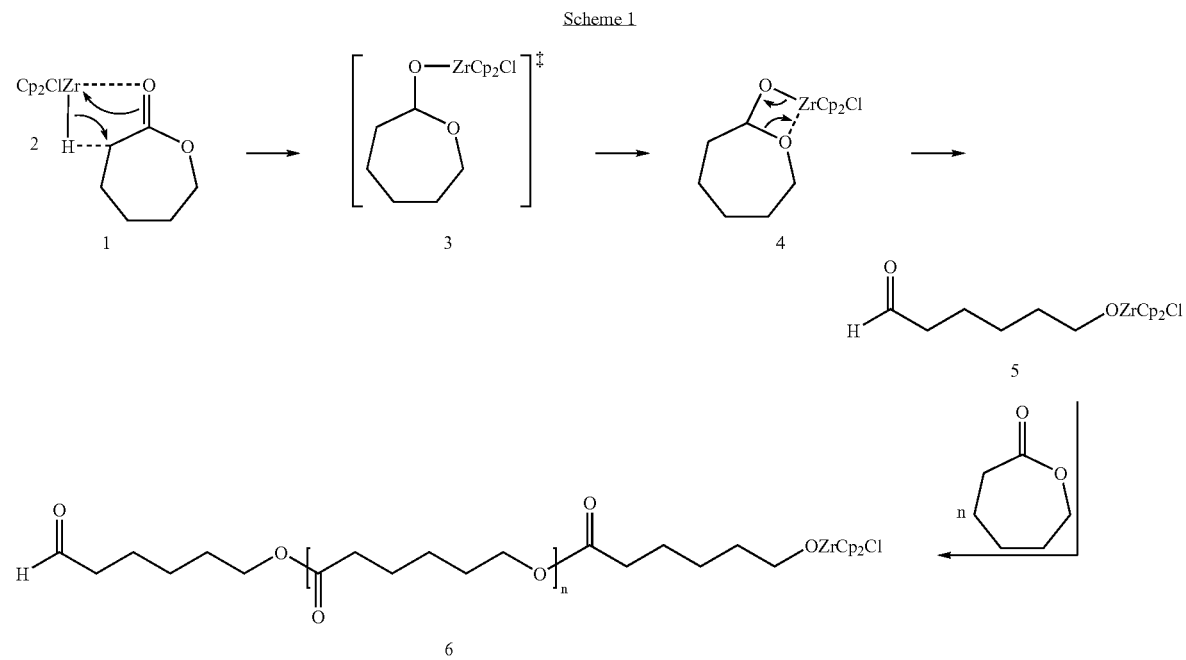

Scheme 1

As shown in the working examples below, this proposed mechanism is supported by the presence of aldehyde chain ends as detected by proton nuclear magnetic resonance spectroscopy.

The Group 4 transition metal hydrides have also been found to catalyze the depolymerization of polymers comprising ester units.

One embodiment is a method of preparing a polyester comprising: polymerizing a cyclic ester in the presence of a catalytic amount of a Group 4 transition metal hydride. Suitable cyclic esters include, for example, $C_3$-$C_{12}$ cyclic monoesters and diesters. Specific cyclic esters that may be employed in the method include, for example, β-propiolactone, γ-butyrolactone, δ-valerolactone, ε-caprolactone, 3-methyl-1,4-dioxane-2,5-dione, 3,6-dimethyl-1,4-dioxane-2,5-dione (lactide), 1,4-dioxane-2,5-dione (glycolide), p-dioxanone, and mixtures thereof. In some embodiments, the cyclic ester is ε-caprolactone. In some embodiments, mixtures of two or more cyclic esters are used, and the result is a random polyester copolymer. In some embodiments, two or more cyclic esters are polymerized in sequence to yield a block copolymer.

The cyclic ester is polymerized in the presence of a catalytic amount of a Group 4 transition metal hydride. The term "catalytic amount" means that the molar ratio of catalyst to monomer (cyclic ester) is less than one. This ratio is typically much less than one. For example, the Group 4 transition metal hydride and the cyclic ester may be present in a molar ratio of about 1:2 to about 1:10,000,000, specifically about 1:10 to about 1:5,000,000, more specifically about 1:100 to about 1:1,000,000, still more specifically about 1:1,000 to about 1:500,000, yet more specifically, about 1:10,000 to about 1:50,000. As used herein, the term "catalyst" is intended to encompass catalyst precursors as well as actual catalysts. Thus, even if it is later demonstrated that the Group 4 transition metal hydride is not the active catalyst of the polymerization, it is still encompassed by the term "catalyst" as used herein because it is an effective catalyst precursor.

The term "Group 4 transition metal" refers to titanium, zirconium, and hafnium. In some embodiments, the Group 4 transition metal is titanium. In some embodiments, the Group 4 transition metal is zirconium. In some embodiments, the Group 4 transition metal is hafnium. A "Group 4 transition metal hydride" comprises a hydrogen atom (a hydridic hydrogen ligand) bound directly to the Group 4 transition metal. In some embodiments, the Group 4 transition metal hydride comprises a Group 4 transition metal atom in the +4 oxidation state.

In some embodiments, the Group 4 transition metal hydride comprises at least one unsubstituted or substituted cyclopentadienyl ligand per Group 4 metal atom. The substituted cyclopentadienyl ligand may comprise one or more substituents such as, for example, $C_1$-$C_{12}$ hydrocarbyl, $C_1$-$C_{12}$ hydrocarbyloxy, trihydrocarbylsilyl, (trihydrocarbylsilyl)hydrocarbyl, and the like, and combinations thereof. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. Substituted cyclopentadienyl ligands further comprise bis(cyclopentadienyl) ligands capable of forming chiral and nonchiral nsa metallocenes. Thus, when two substituted cyclopentadienyl ligands are present, they may combine to form a bis(cyclopentadienyl) ligand. Specific substituted cyclopentadienyl ligands include, for example, methylcyclopentadienyl, dimethylcyclopentadienyls, trimethylcyclopentadienyls, tetramethylcyclopentadienyl, pentamethylcyclopentadienyl, t-butylcyclopentadienyl, trimethylsilylcyclopentadienyl, indenyl, acenapthalenyl, methylene-bis(cyclopentadienyl)s, methylene-bis(indenyl)s, methylene-bis(4,5,6,7-tetrahydro-1-indenyl)s, ethylene-bis (cyclopentadienyl)s, ethylene-bis(indenyl)s, ethylene-bis(4, 5,6,7-tetrahydro-1-indenyl)s, (dimethylsilyl)bis(cyclopentadienyl)s, (dimethylsilyl)bis(indenyl)s, dimethylsilyl-bis(4,5, 6,7-tetrahydro-1-indenyl)s, substituted derivatives of the foregoing, and the like.

In some embodiments, the Group 4 transition metal hydride comprises two unsubstituted or substituted cyclopentadienyl ligands per Group 4 metal atom. These cyclopentadienyl ligands may be the same or different. As mentioned above, the two cyclopentadienyl ligands can combine to form a bis(cyclopentadienyl) ligand.

In some embodiments, the Group 4 transition metal hydride comprises at least two Group 4 transition metal atoms. In such molecules, one or more hydride ligands may, optionally, bridge two metal atoms.

In some embodiments, the Group 4 transition metal hydride has the structure $Cp'_2M(H)(R)$, wherein Cp' is an unsubstituted or substituted cyclopentadienyl ligand; M is titanium, zirconium, or hafnium; R is halogen (fluoride, chloride, bromide, or iodide), $C_1$-$C_{12}$ hydrocarbyl, or $C_1$-$C_{12}$ hydrocarbyloxy; and H is hydride. In some embodiments, M is zirconium. In some embodiments, R is chloride. In some embodiments, the Group 4 transition metal hydride is $Cp_2Zr(H)(Cl)$ (bis(cyclopentadienyl)zirconium hydride chloride; also known as Schwartz's reagent; CAS Reg. No. 37342-97-5).

In some embodiments, the Group 4 transition metal hydride has the structure $Cp'_2 MH_2$, wherein Cp' is an unsubstituted or substituted cyclopentadienyl ligand; M is titanium, zirconium, or hafnium; and H is hydride. In some embodiments M is zirconium. In some embodiments, the Group 4 transition metal hydride is $Cp_2ZrH_2$ (bis(cyclopentadienyl) zirconium dihydride).

In some embodiments, a previously isolated Group 4 transition metal hydride is used as a component of the polymerization reaction mixture. For example, the commercially available Schwartz's reagent (bis(cyclopentadienyl)zirconium(IV) chloride hydride) may be used as the catalyst.

In some embodiments, the Group 4 transition metal hydride is generated in situ by reaction of a Group 4 transition metal halide with a metal hydride reagent comprising a metal other than a Group 4 transition metal. For example, the Group 4 transition metal halide can have the structure $Cp'_2MX_2$, wherein Cp' is an unsubstituted or substituted cyclopentadienyl ligand; M is titanium, zirconium, or hafnium; and each occurrence of X is independently chloride, bromide, or iodide. Suitable classes of metal hydride reagents include, for example, aluminum hydrides, borohydrides, and mixtures thereof. Specific metal hydride reagents suitable for in situ generation of the Group 4 transition metal hydride include, for example, diisobutylaluminum hydride (DIBAH), sodium bis(2-methoxyethoxy)aluminum dihydride (Vitride), lithium aluminum hydride ($LiAlH_4$), lithium tri-tert-butoxyaluminum hydride, and mixtures thereof. Specific borohydrides suitable for in situ generation of the Group 4 transition metal hydride include, for example, sodium borohydride ($NaBH_4$).

Active polymerization catalysts can also be generated by the reaction of a Group 4 transition metal halide with a silver (I) salt, such as $AgClO_4$, $AgPF_6$, and the like. While not wishing to be bound by any particular reaction mechanism, the present inventor believes that this reaction may generate a catalytically active cationic Group 4 transition metal complex.

Polymerization of the cyclic ester may be conducted over a wide range of temperature. For example, the polymerization may be conducted at a temperature of about 20 to about 250° C., specifically about 40 to about 200° C., more specifically about 60 to about 180° C.

In some embodiments, the polymerization occurs with an initiator efficiency of about 0.1 to about 50, specifically about 0.15 to about 35, more specifically about 0.17 to about 20. The initiator efficiency is a measure of the number of polymer chains initiated by each molecule of catalyst. Initiator efficiency is calculated as the ratio of the observed number average molecular weight to the theoretical number average molecular weight, wherein the theoretical number average molecular weight is the molecular weight of the monomer times the molar ratio of monomer to catalyst.

The polymerization may be conducted in the absence or presence of a solvent. When present, the solvent is typically a good solvent for the catalyst and/or the product polyester. Suitable solvents include, for example, aromatic hydrocarbon solvents, aromatic ethers, cyclic and noncyclic aliphatic ethers, halogenated alkanes, and mixtures thereof. Specific solvents suitable for use in the method include, for example, benzene, toluene, dimethylbenzenes, trimethylbenzenes, diphenyl ether, tetrahydrofuran, dioxanes, dichloromethane (methylene chloride), trichloromethane (chloroform), tribromomethane (bromoform), 1,2-dichloroethane, trifluoromethyltoluene, and mixtures thereof.

As mentioned above, the catalyst may be generated from a Group 4 transition metal hydride. For example, one embodiment is a method of preparing a polycaprolactone, comprising: polymerizing ε-caprolactone in the presence of a catalytic amount of bis(cyclopentadienyl)zirconium(IV) chloride hydride. Alternatively, the catalyst may be generated by reacting a Group 4 transition metal hydride with an oxygen-containing compound to form a Group 4 transition metal alkoxide intermediate. Thus, one embodiment is a method of preparing a polyester comprising: reacting a Group 4 transition metal hydride with an oxygen-containing compound selected from the group consisting of aldehydes, ketones, epoxides, peroxides, anhydrides, carboxylic acids, esters, amides, and vinyl ethers to form a Group 4 transition metal alkoxide intermediate; and polymerizing a cyclic ester in the presence of a catalytic amount of the Group 4 transition metal alkoxide intermediate.

The molecular weight of the product polyester may vary widely and is principally controlled by the identity of the catalyst, the concentration of the catalyst with respect to the monomer, and whether the reaction is terminated before it has gone to completion. For example, when a cyclic ester is polymerized, the resulting polyester can have a number average molecular weight of about 500 to about 1,000,000 atomic mass units, specifically about 5,000 to about 700,000 atomic mass units, more specifically 10,000 to about 600,000 atomic mass units, still more specifically about 20,000 to about 500,000 atomic mass units, even more specifically about 50,000 to about 400,000 atomic mass units. One of the important advantages of the present method is that it is capable of producing very high molecular weight polyesters. For example, in some embodiments in which a cyclic ester is polymerized, the resulting polyester can have a number average molecular weight of about 100,000 to about 600,000 atomic mass units, specifically about 150,000 to about 500,000 atomic mass units, more specifically about 200,000 to about 400,000 atomic mass units, still more specifically about 250,000 to about 400,000 atomic mass units, yet more specifically about 300,000 to about 400,000 atomic mass units. Number average molecular weight and weight average molecular weight may be determined by methods known in the art, including the gel permeation chromatography method described in detail in the working examples below.

Another advantage of the present method is that it yields a polymer product having a low polydispersity. Thus, in some embodiments, the polydispersity index (PDI), which is the ratio of the weight average molecular weight ($M_w$) to the number average molecular weight ($M_n$) is about 1.05 to about 1.5, specifically about 1.05 to about 1.3, more specifically about 1.05 to about 1.2.

One embodiment is a method of preparing a polycaprolactone, comprising: polymerizing ε-caprolactone in the presence of a catalytic amount of bis(cyclopentadienyl)zirconium (IV) chloride hydride.

One embodiment is a method of preparing a polyester comprising: reacting a Group 4 transition metal hydride with an oxygen-containing compound selected from the group consisting of aldehydes, ketones, epoxides, peroxides, anhydrides, carboxylic acids, esters, amides, and vinyl ethers to form a Group 4 transition metal alkoxide intermediate; and polymerizing a cyclic ester in the presence of a catalytic amount of the Group 4 transition metal alkoxide intermediate.

Active polymerization catalysts may also be generated by reaction of a Group 4 transition metal hydride with a compound comprising a carbon-carbon double bond, such as an alkene, or $C_{60}$ (buckminsterfullerene), or an unsaturated polymer such as polybutadiene or polyisoprene. The resulting hydrometalated complex can catalyze the ring-opening polymerization of cyclic esters to form polyesters.

To the extent that the product polyesters have different chemical characteristics or properties (for example, higher molecular weights and/or different polydispersities) than previously reported polyesters, they are novel and constitute another embodiment of the invention. For example, one embodiment is a polycaprolactone having a number average molecular weight of at least 100,000 atomic mass units, specifically about 100,000 to about 1,000,000 atomic mass units, more specifically about 150,000 to about 700,000 atomic mass units, even more specifically about 200,000 to about 600,000 atomic mass units, still more specifically about 250,000 to about 400,000 atomic mass units. In some embodiments, the polycaprolactone has a number average molecular weight of at least 150,000 atomic mass units, specifically about 150,000 to about 400,000 atomic mass units, more specifically about 200,000 to about 400,000 atomic mass units, even more specifically about 250,000 to about 400,000 atomic mass units, still more specifically about 300,000 to about 400,000 atomic mass units.

The high molecular weights exhibited by polyesters prepared by the present method provide mechanical properties unattainable with lower molecular weight polyesters. For example, a high molecular weight polycaprolactone prepared by the present method may exhibit at least one of a storage modulus, G', of at least 10 kilopascal, specifically 10 kilopascals to 1 megapascal, at 90° C. and a shear rate of 0.001 to 1,000 rad/sec; a loss modulus, G", of at least 10 kilopascal, specifically 10 kilopascals to 100 kilopascals, at 90° C. and a shear rate of 0.001 to 1,000 rad/sec; a complex modulus, G*, of at least 10 kilopascals, specifically 10 kilopascals to 1 megapascal, at 90° C. and a shear rate of 0.001 to 1,000 rad/sec; a complex shear viscosity, η, of 10 kilopascals to 10 megapascals at 90° C. and a shear rate of 0.001 to 1,000 rad/sec; a tensile elongation at break of at least 2,000%, specifically 2,000% to 3,500%, measured at 23° C.; a tensile strength at yield of at least 15 megapascals, specifically 15 to 20 megapascals, measured at 23° C.; a modulus of elasticity of at least 100 megapascals, specifically 100 to 200 megapascals, measured at 23° C.; a Young's modulus of at least 30 megapascals, specifically 30 to 200 megapascals, more specifically 100 to 200 megapascals, measured at 23° C.; and an ultimate tensile strength of at least 20 megapascals, specifically 20 megapascals to 8 gigapascals, measured at 23° C.

The invention further extends to living polymers produced by the process. A living polymer is a polymer comprising at least one active catalyst residue. For example, one embodiment is a polyester comprising a terminal residue having the structure —OMCp'$_2$X, wherein M is titanium, zirconium, or hafnium; each occurrence of Cp' is independently an unsubstituted or substituted cyclopentadienyl ligand; and X is hydride, chloride, bromide, iodide, $C_1$-$C_{12}$ hydrocarbyl, or $C_1$-$C_{12}$ hydrocarbyloxy. Another embodiment is a polycaprolactone comprising a terminal residue having the structure —OZrCp'$_2$Cl, wherein each occurrence of Cp' is independently an unsubstituted or substituted cyclopentadienyl ligand.

The invention further extends to articles comprising high molecular weight polyesters prepared by the present method. For example, high molecular weight polycaprolactones and polylactides prepared by the present method are useful in the fabrication of fibers, surgical instruments, stents, implants, prostheses, and drug delivery vehicles.

The Group 4 transition metal hydrides described above as polymerization catalysts have also been discovered to function as depolymerization catalysts. Thus, one embodiment is a method of depolymerizing a polymer comprising ester linkages, comprising: mixing the polymer comprising ester linkages with a catalytic amount of a Group 4 transition metal hydride to form a mixture; and maintaining the mixture at a temperature and for a time effective to depolymerize the polymer comprising ester linkages. The ability to catalyze either polymerization or depolymerization reflects the "living" nature of the catalyst and the fact that a reaction mixture can approach an equilibrium governed, in part, by the relative concentrations of catalyst, polymer, and monomer. For example, addition of catalyst to an existing polymer can result in depolymerization. Depolymerization is also favored by addition of an alcohol or an amine or water to a reaction mixture comprising polymer and catalyst. Polymers comprising ester linkages include, for example, polyesters, polyester-carbonates, and mixtures thereof. To the extent that the depolymerization reactions described here may raise a concern about the stability of polymers prepared by the polymerization methods herein, it should be noted that polymer-bound and unbound catalyst residue is typically removed by an isolation procedure that includes precipitation of the polyester in an alcohol antisolvent.

Another embodiment is a method of depolymerizing a polycaprolactone, comprising: mixing a polycaprolactone and a catalytic amount of bis(cyclopentadienyl)zirconium (chloride)(hydride) to form a mixture; and maintaining the mixture at a temperature of about 0 to about 200° C. for about 1 to about 200 hours. The depolymerization may, optionally, be conducted in the presence of a solvent. Suitable solvents include those described above in the context of polymerization.

The invention is further illustrated by the following non-limiting examples.

Materials

The following reagents were used as received: bis(cyclopentadienyl)zirconium chloride hydride (Schwartz's Reagent, $Cp_2ZrHCl$, 95%, Strem Chemicals), bis(cyclopentadienyl)zirconium dichloride ($Cp_2ZrCl_2$, 99%, Strem Chemicals), bis(cyclopentadienyl)hafnium dichloride ($Cp_2HfCl_2$, 98%, Strem Chemicals), bis(cyclopentadienyl) titanium dichloride ($Cp_2TiCl_2$, 97%, Strem Chemicals), benzyl alcohol (99%), bis(cyclopentadienyl)zirconium dihydride ($Cp_2ZrH_2$, 98%, Alfa), tetraphenylethylene (TPE, 98%, Alfa Aesar), diisobutylaluminum hydride (DIBAH, 1.0 M solution in THF, Aldrich), sodium bis(2-methoxyethoxy)aluminum dihydride (Vitride, $\geq$65 wt. % in toluene, Aldrich), lithium tri-tert-butoxyaluminum hydride (Li(O$^t$Bu)$_3$AlH; 97%, Aldrich), AgClO$_4$ (97%), n-BuLi (1.6 M in hexane, Aldrich), diethylene glycol dimethyl ether (Diglyme, $\geq$99.5%, Fluka). ε-Caprolactone (CL, 99%, Acros) was dried over CaH$_2$ and distilled at 110° C. in vacuum. DL-3,6-dimethyl-1,4-dioxane-2,5-dione (LA, lactide, 99.5+%, Purac) was recrystallized from toluene. Toluene (99.9%), dioxane (99.7%), diphenyl ether (Ph$_2$O, 98%), tetrahydrofuran (THF, 99.9%, Fisher), mesitylene (97%, Acros), 1,2,4-trimethylbenzene (TMB, 98%, Aldrich) were distilled over Na/benzophenone.

Analytical Techniques

Proton nuclear magnetic resonance spectra ($^1$H NMR, 500 MHz) for determination of chain ends and percent monomer conversion were recorded on a Bruker DRX-500 at 24° C. in CDCl$_3$ (Aldrich; 0.03% volume/volume tetramethylsilane). Carbon-13 nuclear magnetic resonance spectra ($^{13}$C NMR, 125 MHz) were recorded on a Bruker DRX-500 at 24° C. in CDCl$_3$ (0.03% v/v TMS, Aldrich).

Gel permeation chromatography (GPC) analyses for determination of number and weight average molecular weights were performed at 34° C. on a Waters 150-C Plus gel permeation chromatograph equipped with a Waters 410 differential refractometer, a Waters 2487 UV-VIS at 254 nanometers, a Polymer Laboratories PL-ELS 1000 evaporative light scattering (ELS) detector with a Jordi Flash Gel $10^5$ Å, 2 Jordi Flash Gel $10^4$ Å, and a Jordi Flash Gel $10^3$ Å column setup. Tetrahydrofuran (THF, 99.9%, HPLC grade, Fisher) was used as eluent. Number average molecular weights ($M_n$) and weight average molecular weights ($M_w$) were determined versus polystyrene standards and are uncorrected for any difference between the retention times of polystyrenes and polyesters of equal molecular weight.

Differential scanning calorimetry (DSC) was performed on a TA Instruments (Q-100 series) DSC-2920 instrument calibrated with In and Zn standards. Typical sample sizes were between 10 and 20 milligrams. Poly(lactide) samples were initially cooled to 0° C. and held for 10 minutes at this temperature. The samples were then heated at 10° C./minute to 200° C. and annealed for 2 minutes at this temperature to remove thermal history. The samples were then cooled to 0° C. at 10° C./minute and held there for 10 minutes, followed by a second heating at 10° C./minute up to 200° C. PCL, PCL-co-P(DL)LA and PCL-b-P(DL)LA samples were initially cooled to –90° C. and held for 10 minutes at this temperature. The samples were then heated at 10° C./minute to 200° C. and annealed for 2 minutes at this temperature to remove thermal history. The samples were then cooled to –90° C. at 10° C./minute and held there for 10 minutes, followed by a second heating at 10° C./minute up to 200° C. Universal Analysis software (TA Instruments, version 4.2 E, build 4.2.0.38) was used to calculate glass transition temperature, $T_g$, and/or melting temperature, $T_m$, from the second heating curve of all polymers.

The rheological properties were studied on an advanced rheometric expansion system (ARES) instrument (Rheometric Scientific, Inc., Piscataway, N.J.). This apparatus is a controlled-strain rheometer with a force-rebalance transducer (2000FRTN1), which allowed the measurement of torque from 0.02 to 2000 gram-centimeter. For noise reduction, 50-millimeter parallel-plate fixtures were used. The thermal equilibrium inside the material was ensured before each measurement. Dynamic shear measurements conducted in this study included G', G", G* (where G*=G'+iG"), η', η", η* (where η*=η'+iη') and tan δ using dynamic frequency sweeps at a constant temperature of 90° C. RSI Orchestrator software (Rheometric Scientific, Inc.) was used to analyze the data.

To study mechanical properties, particularly tensile properties, the polymer (about 700 milligrams) was molded into white homogeneous bars with dimensions of 4.0×0.4×0.12 centimeters by compression molding at 10 metric tons of force in a multicavity mold at 60° C. for 5 minutes. The mold was coated with paintable mold release agent before molding. After molding, the specimens were again compressed at 12 metric tons of force at 60° C. for 5 minutes into a film having a thickness of 0.71 millimeters. Film strips of dimension 4.0×0.4 centimeters were cut and a tensile test was performed on a computer-interfaced Instron 1011 with a 10 pound load cell clamped by a pneumatic pressure of 50 pounds per square inch. The rate of crosshead motion was 5 millimeters/minute, and the data acquisition rate was 10 points per second. Stress-strain curves were constructed from the data, and the modulus was determined by fitting a straight line to the initial part of the curves.

EXAMPLE 1

This example describes the ring-opening polymerization of ε-caprolactone using Schwartz's reagent. Catalyst ($Cp_2ZrHCl$, 23.27 milligrams (mg), 0.09 millimoles (mmol)), CL (1 milliliter (mL), 9.02 mmol) and toluene (1 mL) were added to a to a 25-milliliter Schlenk tube. The tube was degassed, filled with argon (Ar), and heated to 90° C. and maintained at the temperature for 2.5 hours. A colorless homogeneous solution was formed after less than one minute at 90° C. Periodically, samples were taken under Ar using an airtight syringe, divided into two parts. The first part was used for determination of percent conversion by $^1$H NMR, which indicated 93 percent conversion of monomer. The second part was used for molecular weight determination by GPC, which indicated a number average molecular weight of 36,577 and a polydispersity index of 1.2.

EXAMPLE 2

This example describes the synthesis of a high molecular weight polycaprolactone using Schwartz's reagent. 0.14 mL of $Cp_2ZrHCl$ stock solution in toluene ($Cp_2ZrHCl$, 15 mg, 0.058 mmol in 3 mL toluene), CL (6 mL, 54.1 mmol), and toluene (18 mL) were added to a to a 250-mL Schlenk tube. The tube was degassed, filled with Ar, and refluxed at 150° C. under Ar. A colorless homogeneous solution was formed in less than one minute. Periodically, samples were taken under Ar using an airtight syringe and divided into two parts for percent conversion and molecular weight determination. These analyses indicated a 93% conversion of monomer, a number average molecular weight of 327,617 atomic mass units, and a polydispersity index of 1.13.

EXAMPLE 3

This example describes synthesis of a high molecular weight polycaprolactone using bis(cyclopentadienyl)zirconium dihydride. $Cp_2ZrH_2$ (10.0 mg, 0.045 mmol), CL (50 microliters (μL), 0.451 mmol) and toluene (4 mL) were combined in a Schlenk tube inside a glove box and heated to 90° C. A homogeneous dispersion (a cloudy mixture in which the cloudiness did not settle) was formed after 15 minutes. 162 μL of the solution was added into a 250 mL Schlenk tube containing a pre-degassed mixture of CL (4 mL, 36.1 mmol) and toluene (16 mL). The tube was re-degassed, filled with Ar and was heated to 130° C. under Ar. A colorless homogeneous solution was formed. Periodically, samples were taken under Ar using an airtight syringe and divided into two parts for percent conversion and molecular weight determination. These analyses indicated a 66 percent conversion of monomer after 26 hours, a number average molecular weight of 278,778 atomic mass units, and a polydispersity index of 1.42.

EXAMPLE 4

This example describes the ring-opening polymerization of ε-caprolactone by a method that includes in situ generation of active catalyst by reaction of bis(cyclopentadienyl)zirconium dichloride with the hydride reagent Vitride. $Cp_2ZrCl_2$ (26.3 mg, 0.09 mmol) and toluene (6 mL) were combined in a Schlenk tube and the tube was degassed and filled with Ar. Vitride (13.7 μL, 0.045 mmol) was added using an air-tight syringe under Ar and heated at 90° C. A red clear solution was formed within 10 minutes. A pre-degassed mixture of CL (1 mL, 9 mmol) and toluene (1 mL) was cannulated into the red solution, and the resulting mixture was then heated at 90° C. under Ar. A colorless, transparent and homogeneous solution was formed within 1-2 minutes. Periodically, samples were taken under Ar using an airtight syringe and divided into two parts for percent conversion and molecular weight determination. These analyses indicated a 66 percent conversion of monomer after 26 hours, a number average molecular weight of 32,142 atomic mass units, and a polydispersity index of 1.18.

EXAMPLE 5

This example describes the ring-opening polymerization of ε-caprolactone using a catalyst generated via hydrozirconation. $Cp_2ZrClH$ (46.5 mg, 0.18 mmol), tetraphenylethylene (TPE, 240 mg, 0.72 mmol) and toluene (1 mL) were combined in a Schlenk tube and the tube was degassed, filled with Ar, and heated to 90° C. A red clear solution was formed within 10 minutes. A pre-degassed mixture of CL (1 mL, 9.02 mmol) and toluene (1 mL) was added to the Schlenk tube via cannula at 90° C. The solution became clear and colorless within a second. Samples were taken under Ar using an airtight syringe and divided into two parts for percent conversion and molecular weight determination. These analyses indicated a 99% conversion of monomer after 1.1 hours, a number average molecular weight of 21,000 atomic mass units, and a polydispersity index of 1.17.

EXAMPLE 6

This example illustrates the ring-opening polymerization of DL-lactide ((DL)-LA) using $Cp_2ZrHCl$. Catalyst ($Cp_2ZrHCl$, 7.15 mg, 0.027 mmol), (DL)-LA (4 g, 27.7 mmol) and $Ph_2O$ (4 mL) were added to a to a 25-mL Schlenk tube. The tube was degassed, filled with Ar, and heated at 150° C. for 72 hours. A homogeneous solution was formed in less than 1 minute. A yellow color was developed in next 15 minutes. Samples were taken under Ar using an airtight syringe and divided into two parts for percent conversion and molecular weight determination. These analyses indicated a 91% conversion of monomer, a number average molecular weight of 28,791 atomic mass units, and a polydispersity index of 1.26.

EXAMPLE 7

Figure 1C:
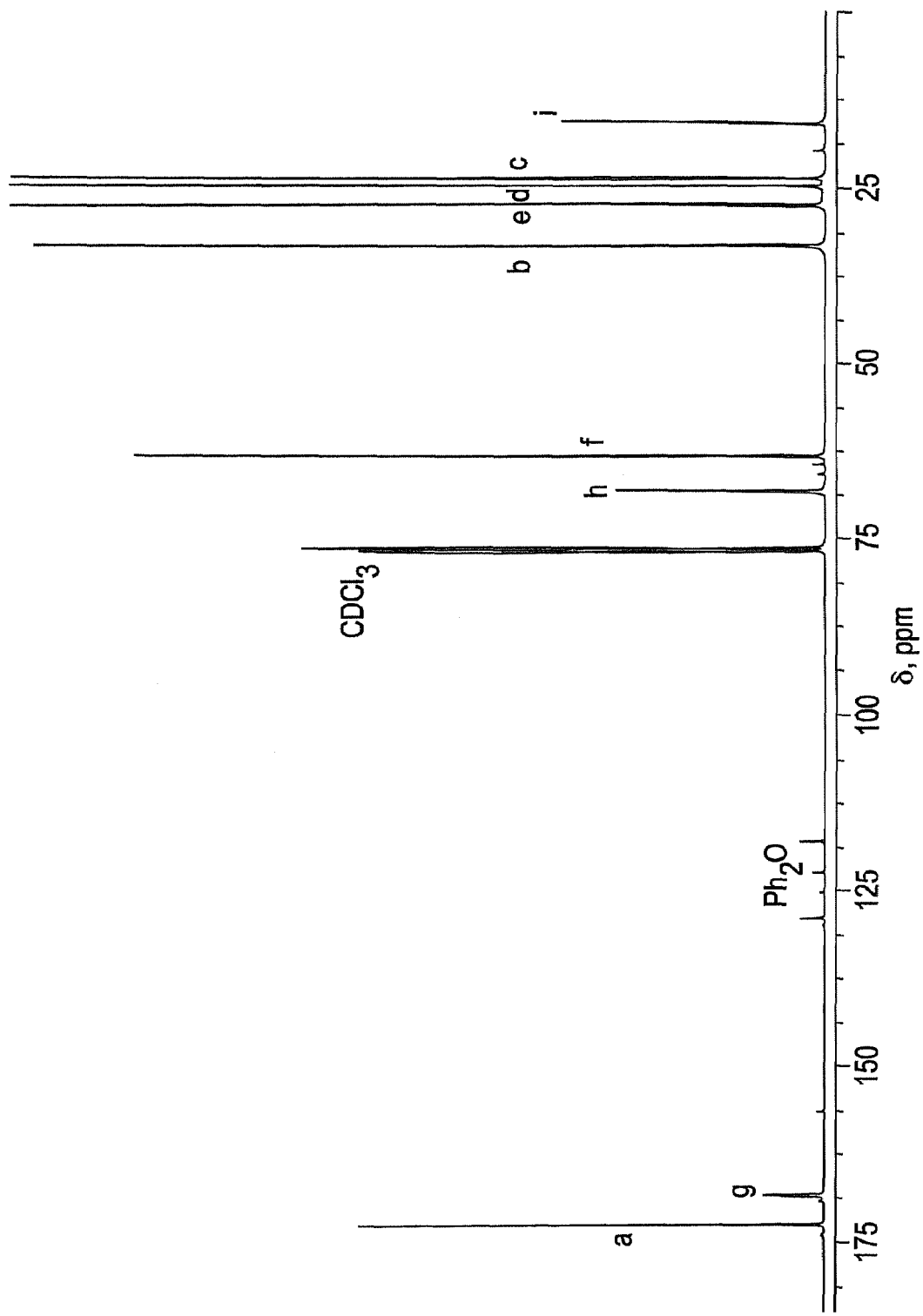
Figure 2:
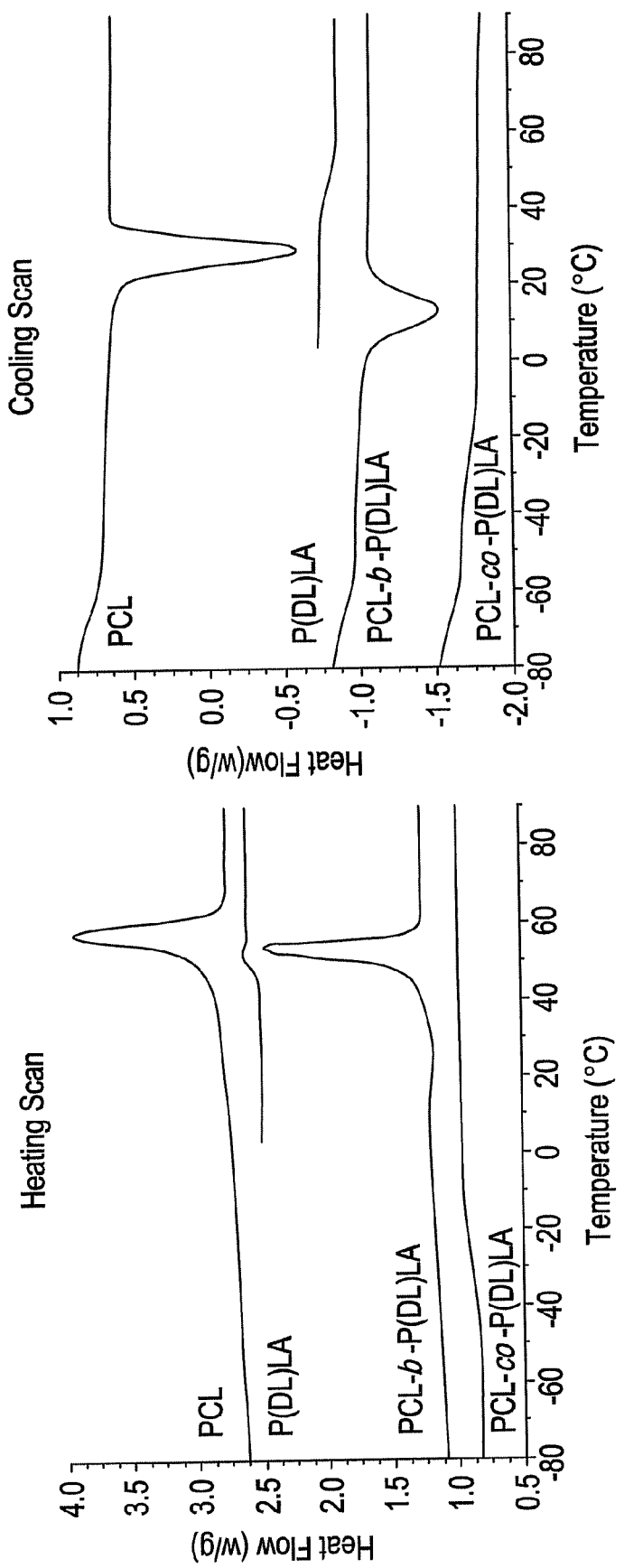
FIG. 2 presents differential scanning calorimetry results for a polylactide-polycaprolactone block copolymer.

This example illustrates the synthesis of a block copolymer using ring-opening polymerization of lactide followed by ring-opening polymerization of lactone. Catalyst ($Cp_2ZrHCl$, 35.8 mg, 0.14 mmol), (dl)-LA (1 g, 6.94 mmol), and $Ph_2O$ (1 mL) were added to a to a 25-mL Schlenk tube. The tube was degassed, filled with Ar, and heated at 130° C. A homogeneous solution formed in under a minute and a yellow color developed over the next 15 minutes. The solution became highly viscous and dark brown within 1.5 hours, and stirring stopped completely after 2 hours. Samples were removed under Ar and characterized by $^1H$ NMR and GPC. These results indicated a 92% conversion of (dl)-LA, a number average molecular weight of 10,621, and a polydispersity index of 1.08. A pre-degassed solution of CL (0.77 mL, 6.93 mmol) in $Ph_2O$ (1 mL) was cannulated into the reaction mixture under Ar, and the mixture was heated at 130° C. for 10 hours. The resulting polymer was dissolved in 2 mL of THF and precipitated in 200 mL of cold methanol. The solid polymer was filtered and dried overnight under vacuum at room temperature. The polymer was characterized by $^1H$ NMR, $^{13}C$ NMR, GPC, and differential scanning calorimetry. These analyses indicated a 78% conversion of CL monomer, a number average molecular weight of 28,447 atomic mass units, and a polydispersity index of 1.37. $^1H$ NMR and $^{13}C$ NMR spectra are presented in FIGS. 1A and 1C, respectively. Differential scanning calorimetry results are presented in FIG. 2.

EXAMPLES 8-55

These examples illustrate polymerizations with variations in the monomer type, catalyst type (catalyst precursor type), hydride reducing agent (if any), and monomer:catalyst mole ratio. Conditions and results are summarized in Table 1, where "mole ratio" is the monomer:catalyst mole ratio, "$M_n$" is the number average molecular weight, "PDI" is the polydispersity index ($M_w/M_n$), "Conv (%)" is the molar conversion of monomer to polymer, "Temp (° C.)" is the reaction temperature in degrees centigrade, "Time (Hrs)" is the time to complete reaction, in hours (unless other units are specified), "Solvent" is the reaction solvent, "Initiator Efficiency" is the average number of chains initiated by one molecule of catalyst, $k_p^{app}$ is the apparent rate constant in hours$^{-1}$, "Ph2O" is diphenyl ether, "PhC(O)H" is benzaldehyde, "Ph2C(O)" is benzophenone, and "bulk" in the solvent column indicates that the reaction was carried out in the absence of solvent.

With respect to monomer type, the results demonstrate polymerization of caprolactone, caprolactone in the presence of benzaldehyde (20:1.5 molar ratio), caprolactone in the presence of benzophenone (20:1.5 molar ratio), lactide, and lactide and caprolactone in sequence (to form a block copolymer). For experiments conducted in the presence of benzaldehyde or benzophenone, the benzaldehyde or benzophenone was first mixed with the catalyst, then the resulting mixture was combined with caprolactone.

With respect to catalyst type, the results show that polymers are generated using Schwartz's reagent ($Cp_2ZrHCl$) or $Cp_2ZrH_2$ or $Cp_2ZrCl_2$+ Vitride or $Cp_2HfCl_2$+Vitride or $Cp_2TiCl_2$+Vitride or $Cp_2ZrCl_2$+Li(OtBu)$_3$AlH or $Cp_2ZrCl_2$+ (iBu)$_2$AlH. However, DIBAH in the absence of a Group 4 metallocene did not catalyze polymerization, nor did $Cp_2ZrCl_2$ in the absence of a hydride reagent.

With respect to mole ratio of monomer to catalyst, the results demonstrate successful polymerization over a range of ratios from 20:1 to 80,000:1. Higher ratios, while requiring longer reaction times, are possible and are expected to produce higher molecular weight polymers.

Initiator efficiencies ranged from 0.17 to 20.39. Apparent rate constants ranged from 0.0008 to 230 hours$^{-1}$.

Solvents successfully employed included toluene, toluene/dioxane, and diphenyl ether. Reaction in the absence of solvent was also demonstrated.

Reaction temperatures varied from 60 to 180° C. Reaction times varied from about 2 minutes to about 138 hours. Percent conversion of monomer in reactions where polymerization occurred ranged from 2 to 100 percent, with many values being from 90 to 100 percent.

With respect to the characteristics of the product polymer, the results demonstrate polycaprolactone number average molecular weights from 900 to 398,500 atomic mass units, with many values substantially greater than 100,000 atomic mass units. Polycaprolactone polydispersities ranged from 1.07 to 3.53, with almost all polydispersity values being less than or equal to 1.5. In an experiment with lactide monomer, the product had a number average molecular weight of 28,791 atomic mass units and a polydispersity of 1.26.

The polymers prepared included not only homopolymers such as polycaprolactone and polylactide, but also random copolymers such as poly(lactone-ran-lactide) and block copolymers such as poly(lactone-b-lactide).

Figure 3:
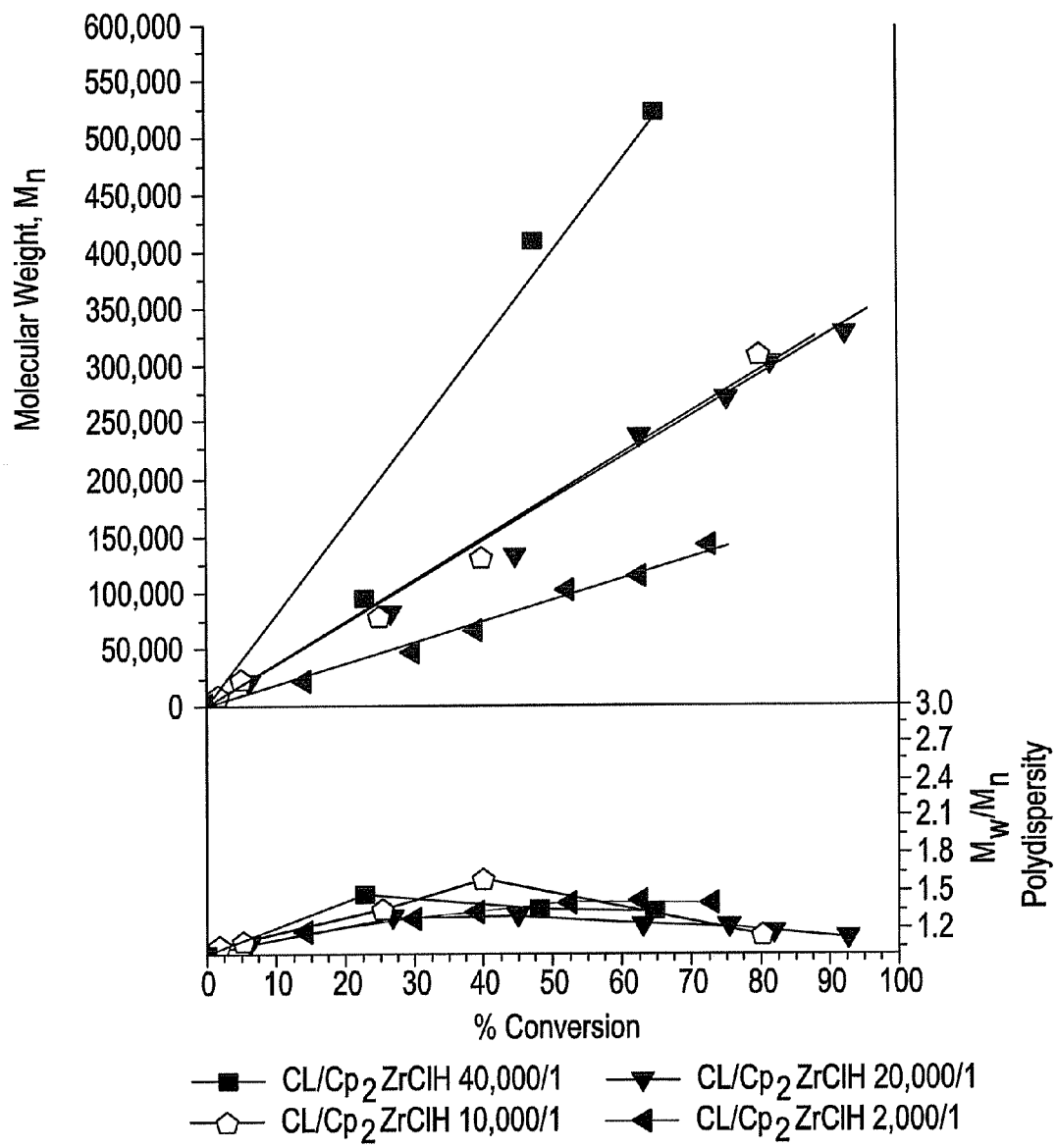
FIG. 3 has two parts, both of which generally relate to ring-opening polymerization of c-caprolactone in the presence of Cp$_2$Zr(H)(Cl); the upper part of FIG. 3 shows number average molecular weight of the polycaprolactone product as a function of percent conversion of monomer and the initial ratio of monomer to catalyst; the lower part of FIG. 3 shows the polydispersity index (PDI) of the polycaprolactone product as a function of percent conversion of monomer and the initial ratio of monomer to catalyst.

Molecular weight results from select experiments are plotted in FIG. 3. These results indicate that number average molecular weight builds linearly with percent conversion, that number average molecular weight increases monotonically with increasing monomer:catalyst ratio at any given percent conversion, and that polydispersity index is essentially independent of percent conversion and monomer:catalyst ratio.

Figure 4:
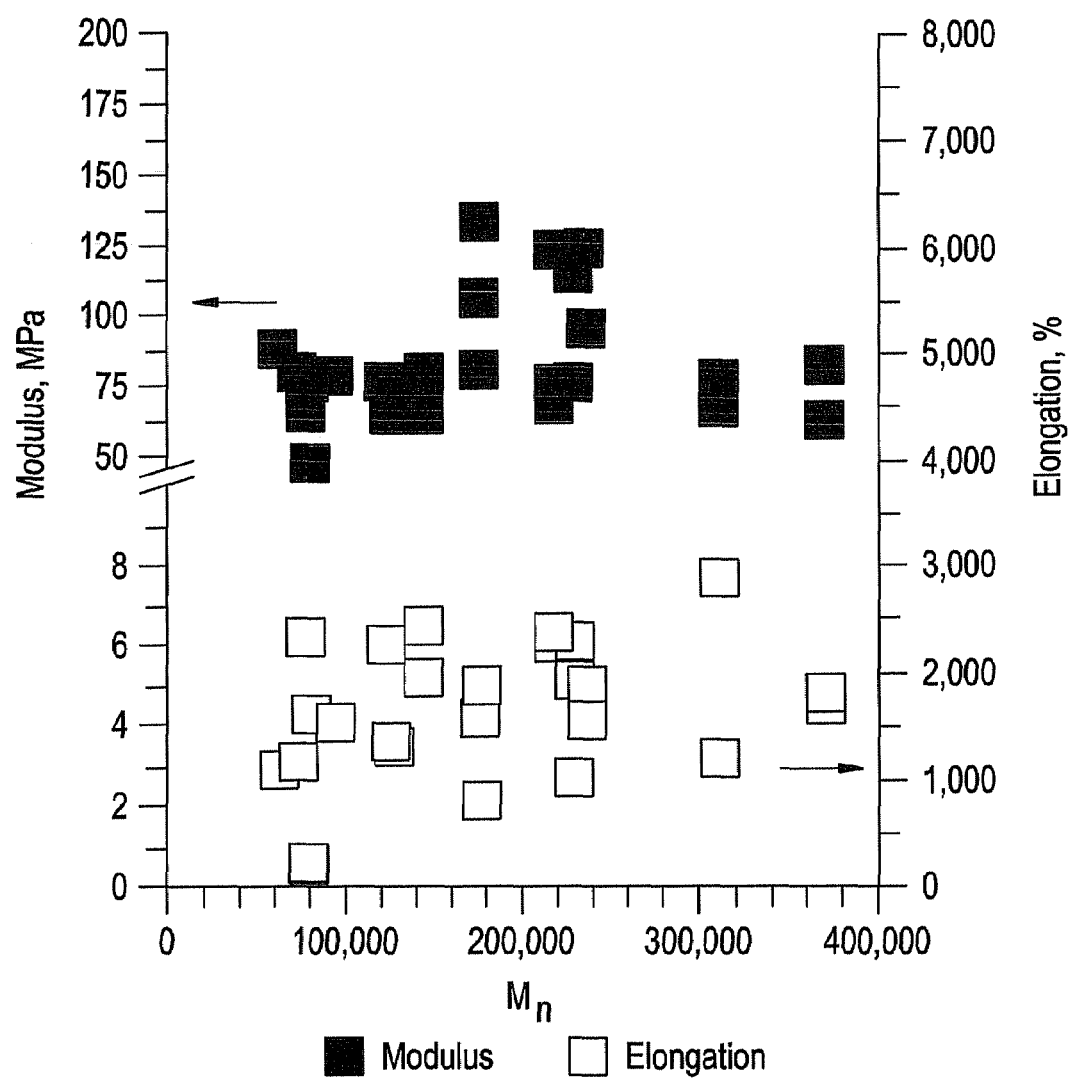
FIG. 4 is a plot of tensile modulus and tensile elongation values for polycaprolactones of varying molecular weight.

Tensile modulus and tensile elongation results from select experiments are plotted in FIG. 4.

TABLE 1

| Ex. | Monomer | Catalyst | Reducing agent | Mole Ratio | $M_n$ | PDI | Conv (%) | Temp (° C.) | Time (Hrs) | Solvent | Initiator Efficiency | $k_p^{app}$ (h$^{-1}$) |
|---|---|---|---|---|---|---|---|---|---|---|---|---|
| 8 | CL | $Cp_2ZrClH$ | — | 100/1 | 20,245 | 1.25 | 94 | 60 | 46.5 | Toluene | 0.51 | 0.06 |
| 9 | CL | $Cp_2ZrH_2$ | — | 100/1 | 8,911 | 1.16 | 47 | 60 | 0.75 | Toluene | 0.59 | 0.79 |
| 10 | CL | $Cp_2ZrClH$ | — | 100/1 | 25,247 | 1.18 | 90 | 75 | 7.5 | Toluene | 0.42 | 0.29 |
| 11 | CL | $Cp_2ZrClH$ | — | 100/1 | 11,260 | 1.22 | 57 | 75 | 8.5 | Bulk | 0.58 | 0.11 |
| 12 | CL | $Cp_2ZrH_2$ | — | 100/1 | 5,295 | 1.24 | 54 | 75 | 0.16 | Toluene | 1.18 | 4.77 |
| 13 | CL | $Cp_2ZrClH$ | — | 50/1 | 17,413 | 1.16 | 94 | 90 | 1.16 | Toluene | 0.32 | 2.25 |
| 14 | CL | $Cp_2ZrClH$ | — | 100/1 | 36,577 | 1.2 | 93 | 90 | 2.5 | Toluene | 0.28 | 1.06 |
| 15 | CL | $Cp_2ZrClH$ | — | 200/1 | 27,957 | 1.26 | 73 | 90 | 8.66 | Toluene | 0.6 | 0.16 |
| 16 | CL | $Cp_2ZrClH$ | — | 500/1 | 37,822 | 1.47 | 83 | 90 | 48 | Toluene | 1.49 | 0.039 |

TABLE 1-continued

| Ex. | Monomer | Catalyst | Reducing agent | Mole Ratio | $M_n$ | PDI | Conv (%) | Temp (°C.) | Time (Hrs) | Solvent | Initiator Efficiency | $k_p^{app}$ ($h^{-1}$) |
|---|---|---|---|---|---|---|---|---|---|---|---|---|
| 17 | CL | $Cp_2ZrClH$ | — | 1000/1 | 69,719 | 1.45 | 81 | 90 | 84.5 | Toluene | 1.38 | 0.02 |
| 18 | CL | $Cp_2ZrH_2$ | — | 100/1 | 11,578 | 1.26 | 88 | 90 | 2 min | Toluene | 0.86 | 70.67 |
| 19 | CL | $Cp_2ZrH_2$ | — | 500/1 | 94,221 | 1.47 | 100 | 90 | 2.16 | Toluene | 0.69 | 1.74 |
| 20 | CL | $Cp_2ZrClH$ | — | 200/1 | 42,151 | 1.36 | 91 | 110 | 6 | Toluene | 0.53 | 0.41 |
| 21 | CL | $Cp_2ZrClH$ | — | 10000/1 | 90,138 | 1.22 | 80 | 110 | 95.5 | Toluene | 11.88 | 0.01 |
| 22 | CL | $Cp_2ZrClH$ | — | 800/1 | 78,912 | 1.42 | 82 | 130 | 4.83 | Toluene | 1.07 | 0.37 |
| 23 | CL | $Cp_2ZrClH$ | — | 5000/1 | 97,238 | 1.38 | 99 | 130 | 22 | Ph2O | 5.72 | 0.4 |
| 24 | CL | $Cp_2ZrClH$ | — | 10000/1 | 127,112 | 1.43 | 81 | 130 | 29 | Ph2O | 7.29 | 0.05 |
| 25 | CL | $Cp_2ZrH_2$ | — | 10000/1 | 231,952 | 1.4 | 87 | 130 | 40 | Toluene | 4.59 | 0.04 |
| 26 | CL | $Cp_2ZrH_2$ | — | 20000/1 | 278,778 | 1.42 | 66 | 130 | 26 | Toluene | 5.39 | 0.04 |
| 27 | CL | $Cp_2ZrClH$ | — | 1000/1 | 119,553 | 1.39 | 70 | 140 | 2.75 | Toluene | 0.73 | 0.45 |
| 28 | CL | $Cp_2ZrClH$ | — | 2000/1 | 173,006 | 1.34 | 67 | 140 | 5 | Toluene | 0.94 | 0.22 |
| 29 | CL | $Cp_2ZrClH$ | — | 2000/1 | 141,228 | 1.4 | 73 | 150 | 8.75 | Toluene | 1.23 | 0.1527 |
| 30 | CL | $Cp_2ZrClH$ | — | 10000/1 | 307,440 | 1.14 | 80 | 150 | 47 | Toluene | 3.1 | 0.03 |
| 31 | CL | $Cp_2ZrClH$ | — | 20000/1 | 327,617 | 1.13 | 93 | 150 | 37 | Toluene | 6.19 | 0.07 |
| 32 | CL | $Cp_2ZrClH$ | — | 20000/1 | 344,018 | 1.43 | 77 | 150 | 25 | Toluene | 4.84 | 0.05 |
| 33 | CL | $Cp_2ZrClH$ | — | 40000/1 | 331,099 | 1.44 | 97 | 150 | 87 | Toluene | 13.6 | 0.04 |
| 34 | CL | $Cp_2ZrClH$ | — | 80000/1 | 398,500 | 1.46 | 86 | 150 | 137.5 | Toluene | 20.39 | 0.01 |
| 35 | CL | $Cp_2ZrH_2$ | — | 5000/1 | 324,413 | 1.49 | 75 | 150 | 46 | Toluene | 1.5 | 0.03 |
| 36 | CL | $Cp_2ZrClH$ | — | 1000/1 | 120,575 | 1.36 | 71 | 180 | 0.33 | Ph2O | 0.79 | 4.85 |
| 37 | CL/ PhC(O)H | $Cp_2ZrClH$ | | 20/1.5/1 | 7,849 | 1.12 | 100 | 90 | 24 | Toluene | 0.29 | 0.38 |
| 38 | CL/ Ph2C(O) | $Cp_2ZrClH$ | | 20/1.5/1 | 12,883 | 1.23 | 100 | 90 | 24 | Toluene | 0.17 | 0.38 |
| 39 | LA | $Cp_2ZrClH$ | — | 1000/1 | 28,791 | 1.26 | 91 | 150 | 72 | Ph2O | | |
| 40 | CL | $Cp_2HfCl_2$ | Vitride | 100/1/0.5 | 11,617 | 1.07 | 85 | 90 | 2.5 | Toluene | 0.83 | 0.07 |
| 41 | CL | $Cp_2TiCl_2$ | Vitride | 100/1/1.5 | 5,261 | 1.71 | 99 | 90 | 17 | Toluene | 2.14 | 0.27 |
| 42 | CL | $Cp_2TiCl_2$ | Vitride | 100/1/1 | 11,932 | 1.43 | 100 | 90 | 24 | Toluene/ Dioxane | 0.95 | 0.38 |
| 43 | CL | $Cp_2ZrCl_2$ | Vitride | 100/1/0.5 | 32,142 | 1.18 | 94 | 90 | 1 | Toluene | 0.33 | 2.81 |
| 44 | CL | $Cp_2ZrCl_2$ | Vitride | 100/1/0.5 | 17,826 | 1.28 | 100 | 90 | 0.5 | Toluene | 0.63 | 18.42 |
| 45 | CL | $Cp_2ZrCl_2$ | Vitride | 100/1/0.5 | 11,779 | 1.31 | 97 | 90 | 17 | Toluene | 0.93 | 0.2 |
| 46 | CL | $Cp_2ZrCl_2$ | Li(OtBu)3AlH | 100/1/1 | 32,590 | 1.22 | 80 | 90 | 1 | Toluene | 0.28 | 1.6 |
| 47 | CL | $Cp_2ZrCl_2$ | Vitride | 200/1/0.5 | 38,867 | 1.09 | 82 | 90 | 12 | Toluene | 0.48 | 0.14 |
| 48 | CL | $Cp_2ZrCl_2$ | DIBAH | 100/1/1 | 43,151 | 1.21 | 100 | 90 | 0.03 | Toluene | 0.26 | 230 |
| 49 | CL | $Cp_2ZrCl_2$ | DIBAH | 1000/1/1 | 1,134 | 1.26 | 6 | 90 | 24 | Toluene | 6.03 | 0.002 |
| 50 | CL | $Cp_2ZrCl_2$ | DIBAH | 500/1/1.1 | 900 | 1.3 | 2 | 90 | 24 | Toluene | 1.26 | 0.0008 |
| 51 | CL | $Cp_2ZrCl_2$ | DIBAH | 250/1/1.2 | 1,521 | 1.22 | 12 | 90 | 17.75 | Toluene | 2.24 | 0.007 |
| 52 | CL | | Vitride | 100/0.5 | 1,280 | 3.53 | 57 | 90 | 4 | Toluene | 5.07 | 0.21 |
| 53 | CL | | DIBAH | 1000/1 | 0 | 0 | 0 | 90 | 28 | Toluene | 0 | 0 |
| 54 | CL | $Cp2ZrCl_2$ | — | 100/1 | 0 | 0 | 0 | 90 | 29 | Toluene | 0 | 0 |
| 55 | LA/CL (block) | $Cp2ZrClH$ | — | 50/50/1 | 28447 | 1.37 | 90, 78 | 130 | 12 | Ph2O | — | — |

EXAMPLES 56 AND 57

These examples illustrate characterization of living oligomers and polymers produced by the method.

Figure 5A:
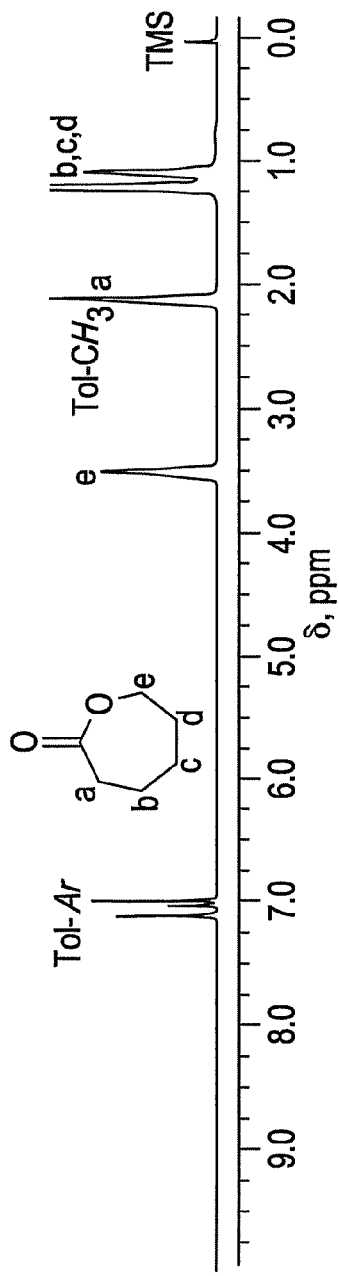
FIG. 5 consists of four $^1$H NMR spectra in toluene-$d_8$: (5A) ε-caprolactone (CL) monomer, (5B) [CL]/[Cp$_2$ZrHCl]=2/1 at room temperature, (5C) [CL]/[Cp$_2$ZrHCl]=2/1 at 60° C., and (5D) and polycaprolactone (PCL).
Figure 5B:
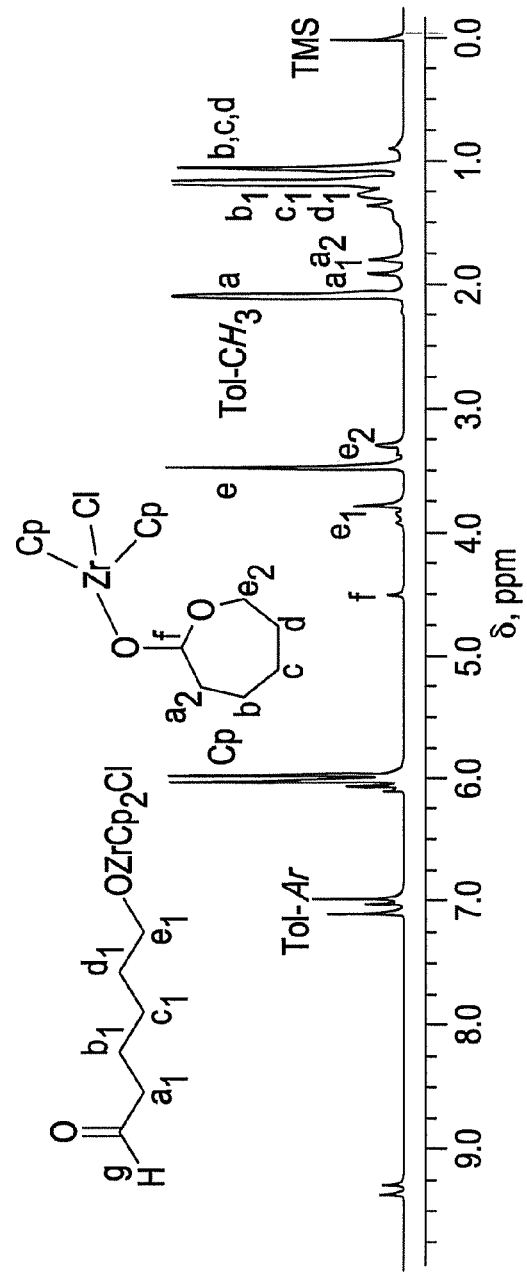

For Example 56, ε-caprolactone (CL) and $Cp_2ZrClH$ were combined in a 2:1 molar ratio and dissolved in toluene-$d_8$ (Tol-d8) in an NMR tube. The sample was analyzed by $^1H$ NMR at room temperature (FIGS. 5(b)) and 60° C. (FIG. 5(c)) and compared to a control sample of ε-caprolactone in toluene-$d_8$ at room temperature (FIG. 5(a)) and a control sample of polycaprolactone (FIG. 5(d)). The FIG. 5(b) spectrum includes a resonance at about 9.3 ppm consistent with an aldehyde proton. This resonance is not present when the sample is heated to 60° C. (FIG. 5(c)), which contains peaks consistent with a ring opened structure, as further demonstrated by a comparison with the spectrum of polycaprolactone (FIG. 5(d)).

Figure 6:
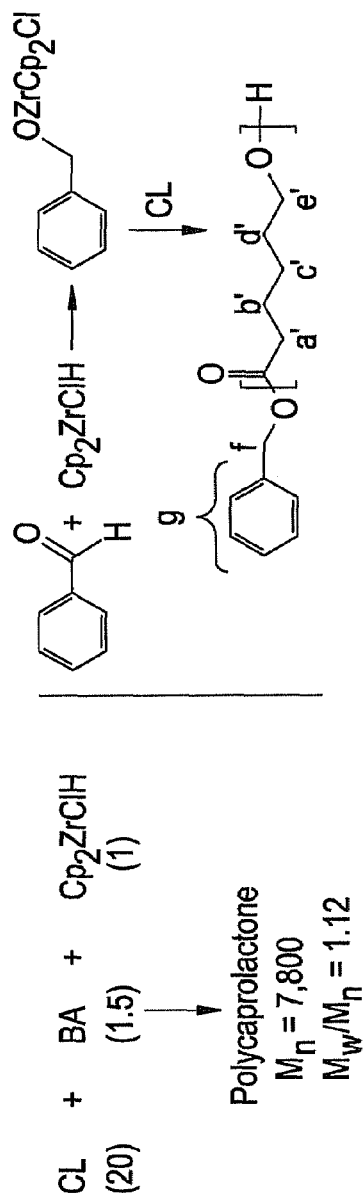
FIG. 6 is a $^1$H NMR spectrum of the reaction mixture resulting from room temperature reaction of a 20:1.5:1 molar ratio of ε-caprolactone, benzaldehyde, and Cp$_2$ZrClH in which the benzaldehyde and Cp$_2$ZrClH were pre-reacted before addition of ε-caprolactone.
Figure 6:
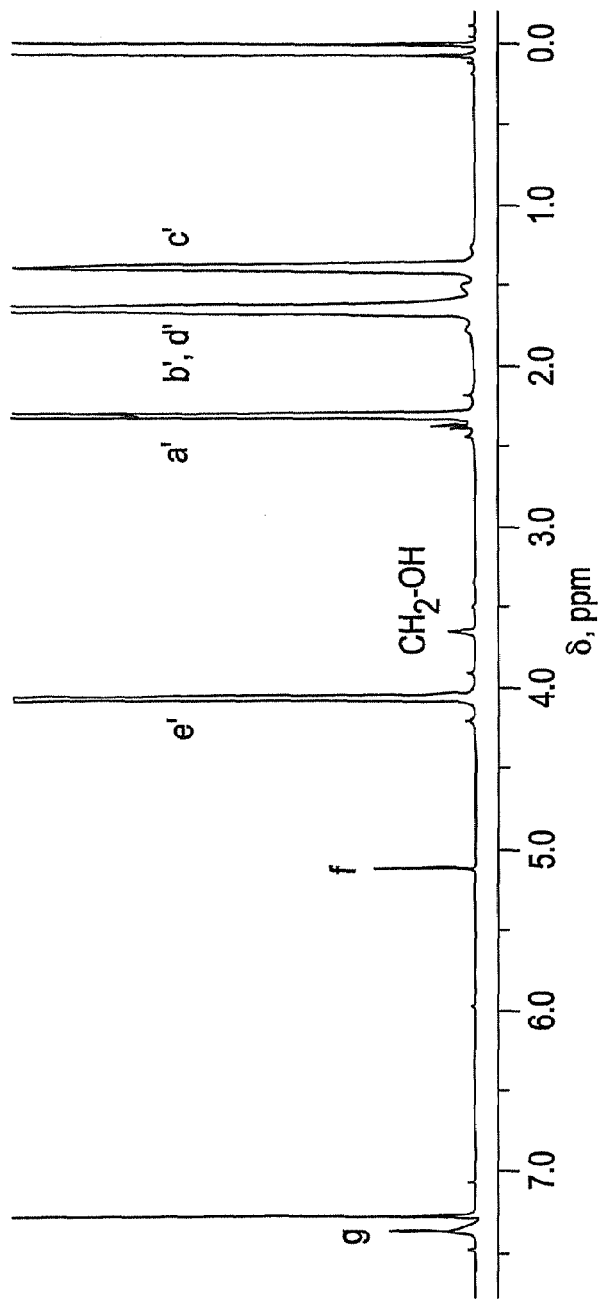

For Example 57, benzaldehyde (BA) and $Cp_2ZrClH$ were combined in a 1.5:1 molar ratio to form a clear solution. Then CL ε-caprolactone (CL), was injected and the polymerization was carried out as described above (CL/BA/$Cp_2ZrClH$=20: 1.5:1 molar ratio). The polymer was precipitated, dried, and dissolved in toluene-$d_8$ (Tol-d8) in an NMR tube. The sample was analyzed by $^1H$ NMR at room temperature. The resulting $^1H$ NMR spectrum is shown in FIG. 6. The spectrum shows resonances associated with the phenyl ring (g, at 7.4 ppm) and with the benzyl (f, at 5.2 ppm) protons, while the resonances associated with benzaldehyde are absent. Independent characterization of the polymer formed indicated a number average molecular weight of 7,800 atomic mass units and a polydispersity of 1.12.

EXAMPLE 58

This example demonstrates the reversibility of the polymerization reaction. Specifically, it demonstrates depolymerization of polycaprolactone using Schwartz's reagent. Polycaprolactone (0.25 g, $M_n$=307,440; $M_w/M_n$=1.14), $Cp_2ZrH_2$ (3.8 mg, 0.014 mmol) and toluene (4 mL) were combined in a Schlenk tube. The tube was degassed, filled with Ar, and heated to 110° C. A colorless homogeneous solution was formed after less than one minute. Samples were taken under Ar using an airtight syringe and divided into two parts for percent conversion and molecular weight determination. The results indicated a number average molecular weight of 12,000 atomic mass units and a polydispersity index of 1.5.

Figure 7:
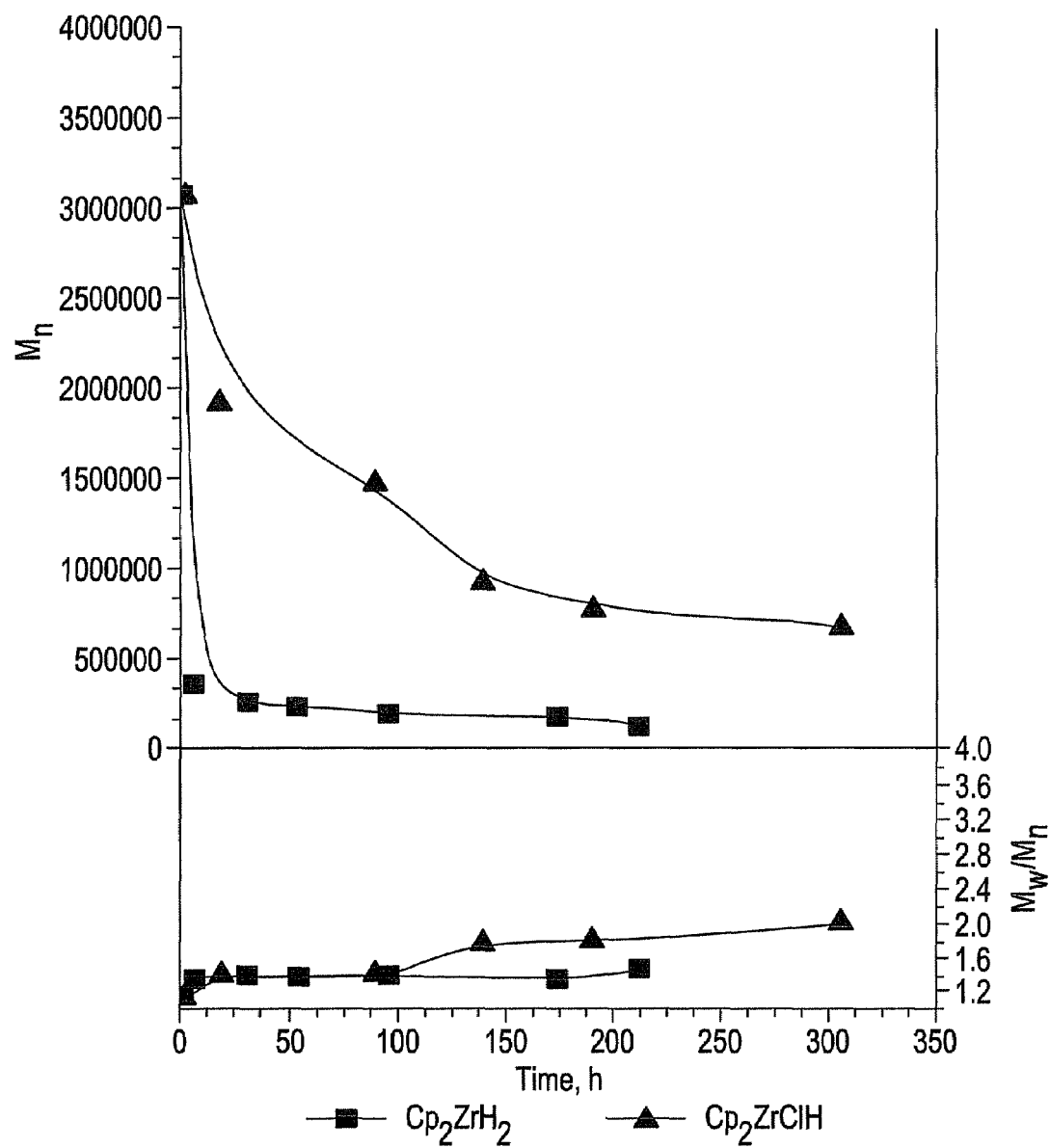
FIG. 7 has two parts, both of which generally relate to depolymerization of ε-caprolactone in the presence of Cp$_2$ZrClH or Cp$_2$ZrH$_2$; the upper part of FIG. 4 shows number average molecular weight of the polycaprolactone as a function of reaction time and catalyst type; the lower part of FIG. 4 shows the polydispersity index (PDI) of the polycaprolactone as a function of reaction time and catalyst type.

A similar experiment was conducted using a $Cp_2ZrClH$ catalyst. A plot of number average molecular weight and polydispersity index as a function of time and catalyst type is presented as FIG. 7.

EXAMPLE 59

Figure 8:
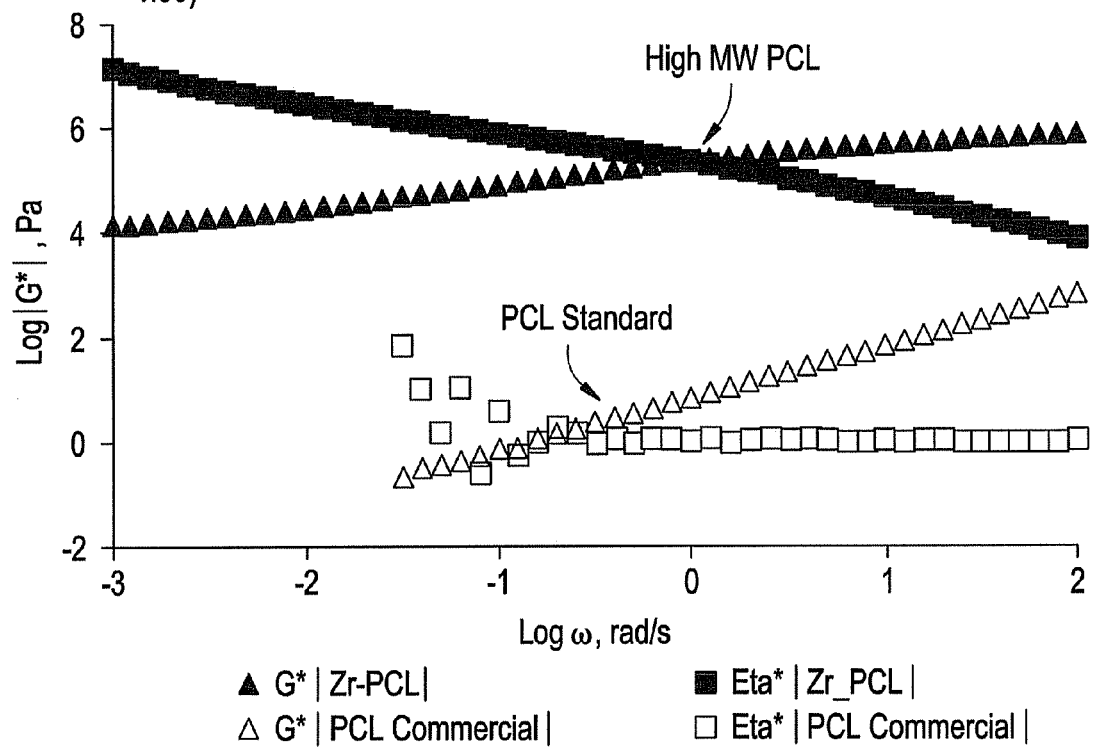
FIG. 8 is a plot of complex modulus and complex viscosity as a function of shear rate for a commercially available polycaprolactone having a number average molecular weight of 18,388 atomic mass units and a polycaprolactone prepared by the present method having a number average molecular weight of 331,099 atomic mass units.
Figure 9:
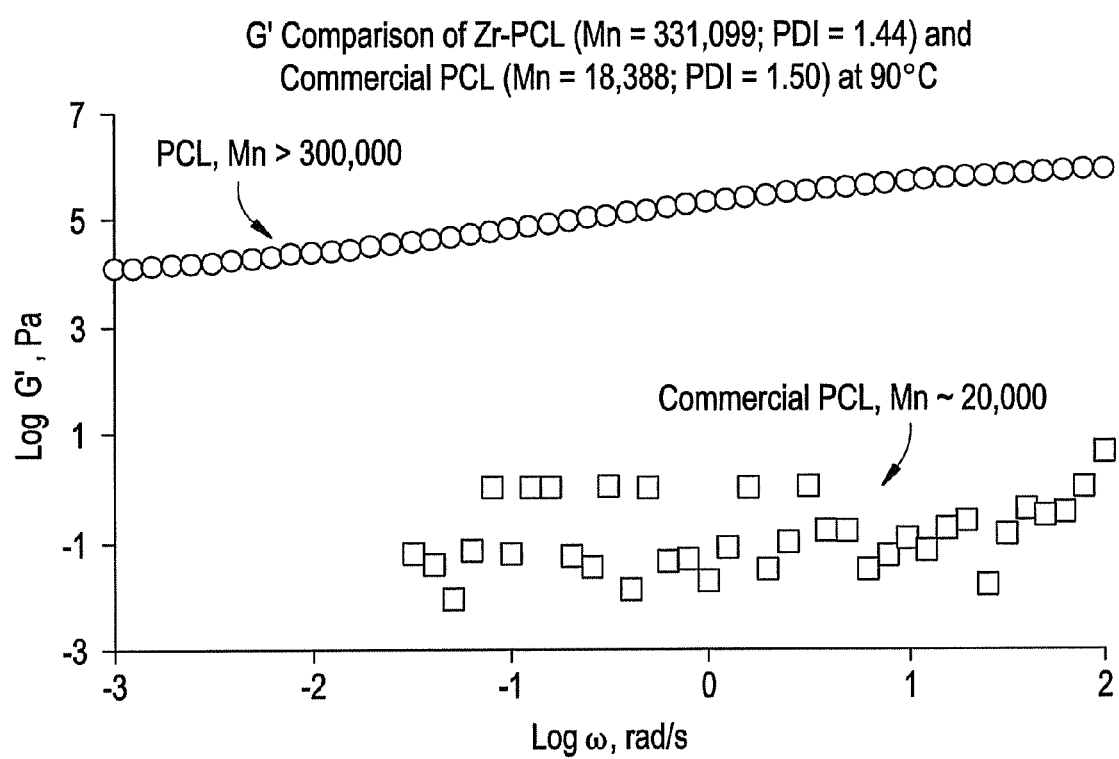
FIG. 9 is a plot of storage modulus, G', as a function of shear rate for a commercially available polycaprolactone having a number average molecular weight of 18,388 atomic mass units and a polycaprolactone prepared by the present method having a number average molecular weight of 331,099 atomic mass units.
Figure 10:
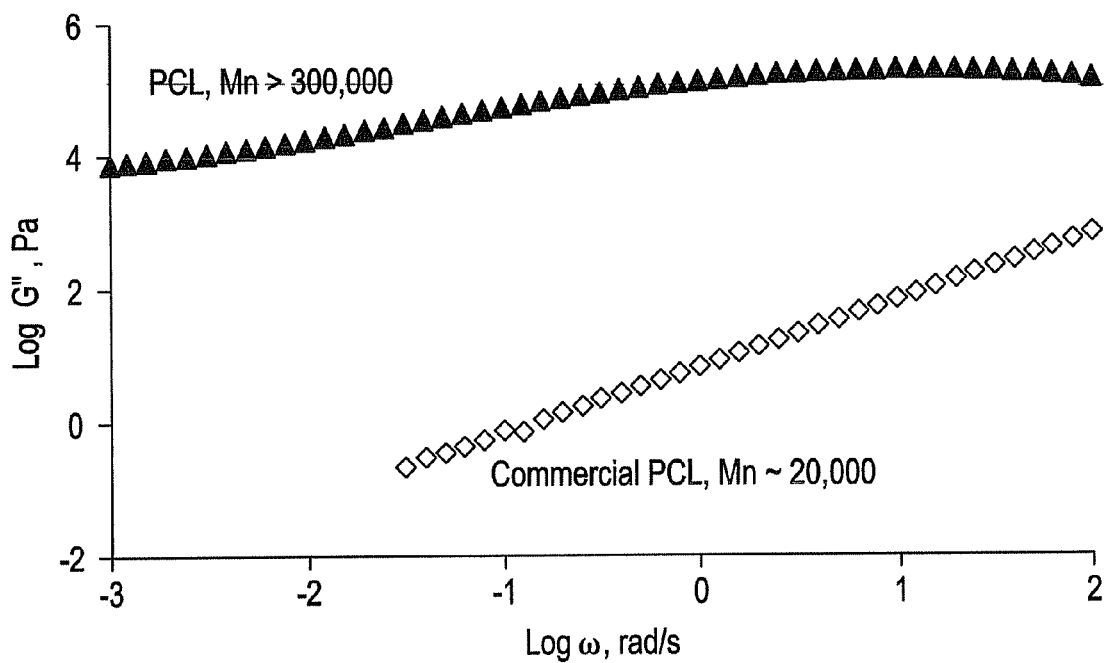
FIG. 10 is a plot of loss modulus, G", as a function of shear rate for a commercially available polycaprolactone having a number average molecular weight of 18,388 atomic mass units and a polycaprolactone prepared by the present method having a number average molecular weight of 331,099 atomic mass units.

This Example compares the rheological properties of a high molecular weight polycaprolactone prepared according to the present method with those of a commercially available polycaprolactone having a much lower molecular weight. The polycaprolactone prepared according to the present method had a number average molecular weight of 331,099 atomic mass units and a polydispersity of 1.44. The commercially available polycaprolactone, which was obtained from Sigma-Aldrich, had a number average molecular weight of 18,388 atomic mass units and a polydispersity of 1.50. The results of dynamic shear measurements, conducted as described above, are plotted in FIGS. 8-10 and show that the high molecular weight polycaprolactone prepared according to the present method exhibited better mechanical properties (e.g., G', G", tensile modulus, and tensile elongation) compared to the lower molecular weight commercially available polycaprolactone.

EXAMPLE 60

Figure 11A:
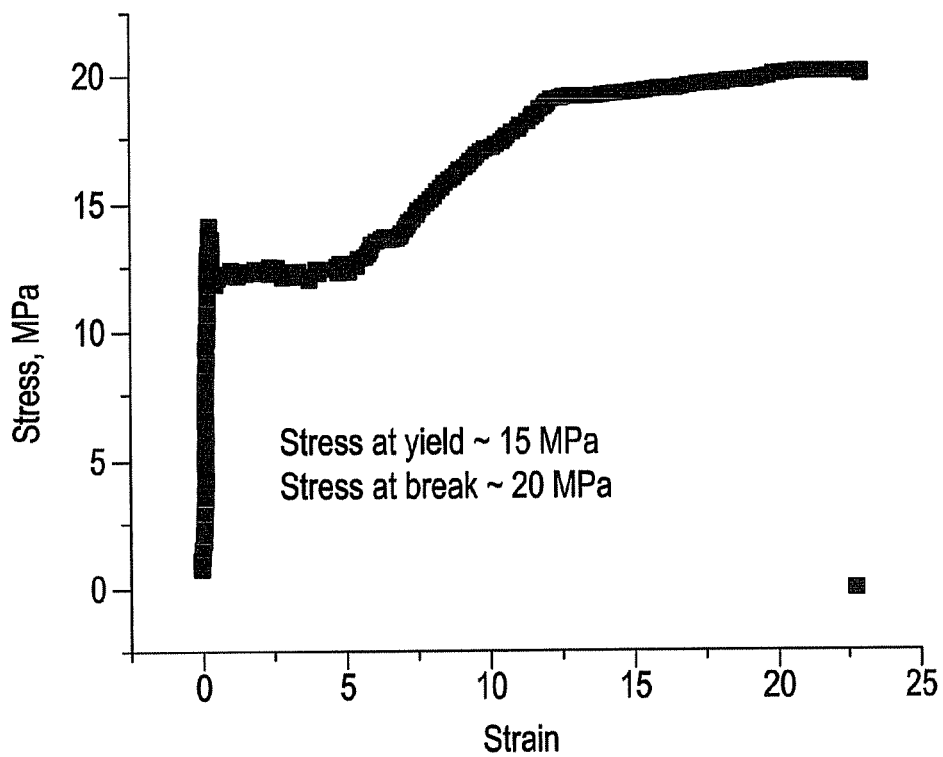
FIG. 11 consists of (11A) a stress-strain curve for a polycaprolactone having a number average molecular weight of 218,500 atomic mass units, and (11B) an enlargement of the initial part of the same curve.
Figure 11B:
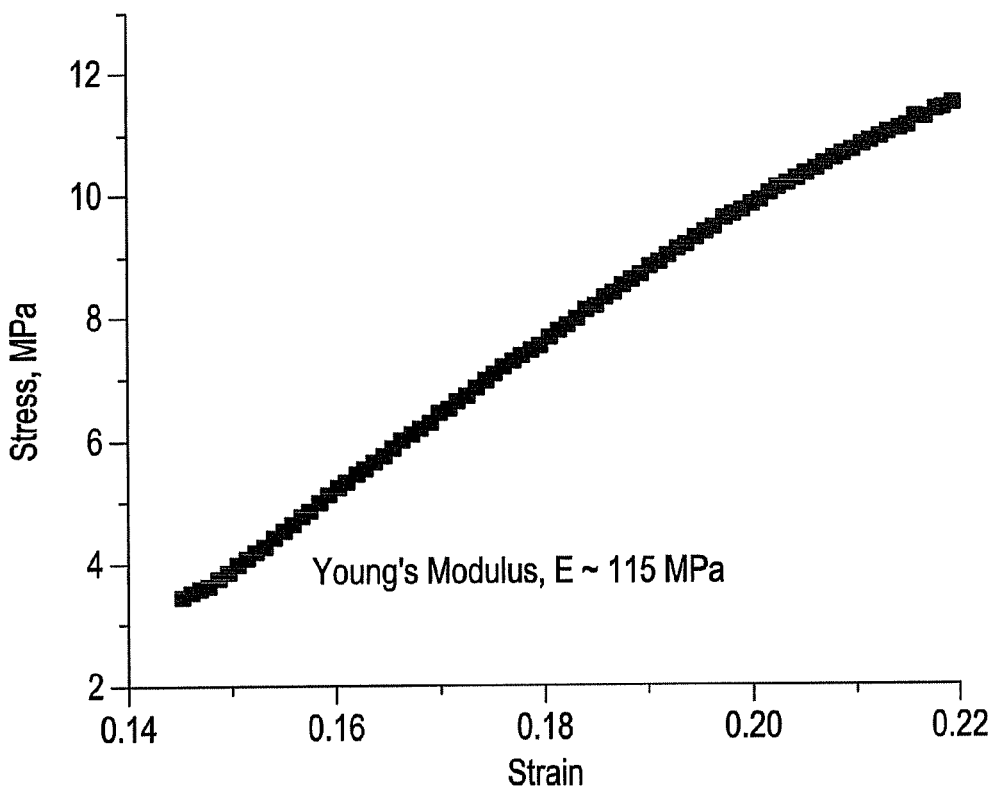

This example illustrates the physical properties of a polycaprolactone prepared according to the present method. The polycaprolactone had a number average molecular weight of 218,500 atomic mass units. Tensile properties were determined at 23° C. using the procedure described above in the last paragraph of the ANALYTICAL TECHNIQUES section. Results are plotted in FIG. 11, where part 11A is a complete stress-strain plot and part 11B is an enlargement of the initial part of the plot. The results indicate that polycaprolactones prepared according to the present method are capable of exhibiting a tensile elongation at break of at least 2000%, a tensile strength at yield of at least 15 megapascals, a modulus of elasticity of at least 115 megapascals, a Young's modulus of at least 115 megapascals, and an ultimate tensile strength of at least 20 megapascals, all measured at 23° C.

EXAMPLE 61

This example illustrates the preparation and characterization of a random copolyester. Catalyst ($Cp_2ZrHCl$, 46.5 mg, 0.18 mmol), monomer (CL, 1 mL, 9.04 mmol and (DL)LA, 1.30 g, 9.02 mmol) and $Ph_2O$ (2 mL) were added to a 25 milliliter Schlenk tube. The tube was degassed, filled with argon, and heated at 130° C. for 16 hours. The resulting polymer was dissolved in 2 milliliters of tetrahydrofuran and precipitated by addition of the tetrahydrofuran solution to cold methanol. The solid polymer was filtered and dried overnight under vacuum at room temperature. The polymer was characterized by $^1H$ NMR, $^{13}C$ NMR, and by GPC ($M_n$=24,600 atomic mass units; PDI=1.51; 98% CL conversion and 72% (DL)LA conversion; PCL/P(DL)LA=40/60).

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The Use of the Terms "a" and "an" and "the" and Similar Referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of preparing a polyester comprising:
polymerizing a cyclic ester in the presence of a catalytic amount of a catalyst consisting of a Group 4 transition metal hydride having the structure $Cp'_2M(H)(R)$, wherein Cp' is an unsubstituted or substituted cyclopentadienyl ligand; M is titanium, zirconium, or hafnium; and R is hydrogen, halogen, $C_1$-$C_{12}$ hydrocarbyl, or $C_1$-$C_{12}$ hydrocarbyloxy.

2. The method of claim 1, wherein the cyclic ester is selected from the group consisting of β-propiolactone, γ-butyrolactone, δ-valerolactone, ε-caprolactone, 3-methyl-1,4-dioxane-2,5-dione, 3,6-dimethyl-1,4-dioxane-2,5-dione, 1,4-dioxane-2,5-dione, p-dioxanone, and mixtures thereof.

3. The method of claim 1, wherein the cyclic ester is ε-caprolactone.

4. The method of claim 1, wherein the cyclic ester comprises a mixture of at least two cyclic esters; and wherein the polymerizing produces a random copolymer.

5. The method of claim 1, wherein the polymerizing a cyclic ester comprises polymerizing a first cyclic ester and subsequently polymerizing a second cyclic ester different from the first cyclic ester; and wherein the polymerizing produces a block copolymer.

6. The method of claim 1, wherein M is titanium.

7. The method of claim 1, wherein M is zirconium.

8. The method of claim 1, wherein M is hafnium.

9. The method of claim 1, wherein R is hydrogen.

10. The method of claim 1, wherein R is chloride.

11. The method of claim 1, wherein R is $C_1$-$C_{12}$ hydrocarbyl.

12. The method of claim 1, wherein the Group 4 transition metal hydride and the cyclic ester are present in a molar ratio of about 1:2 to about 1:10,000,000.

13. The method of claim 1, wherein the polymerizing is conducted at a temperature of about 20 to about 250° C.

14. The method of claim 1, wherein the polymerizing occurs with an initiator efficiency of about 0.1 to about 50.

15. The method of claim 1, wherein the polymerizing occurs with an initiator efficiency of about 0.15 to about 25.

16. The method of claim 1, wherein the polymerizing a cyclic ester produces a polyester having a number average molecular weight of about 200,000 to about 6000,000 atomic mass units.

17. The method of claim 1, wherein the polymerizing a cyclic ester produces a polyester having a number average molecular weight of about 300,000 to about 600,000 atomic mass units.

18. The method of claim 1, wherein the polymerizing a cyclic ester produces a polyester having a polydispersity index of about 1.05 to about 1.5.

19. The method of claim 1, wherein R is $C_1$-$C_{12}$ hydrocarbyloxy.

20. The method of claim 1, wherein the polymerizing the cyclic ester is conducted in the presence of a solvent.

21. The method of claim 20, wherein the solvent is selected from the group consisting of aromatic hydrocarbon solvents, aromatic ethers, aliphatic ethers, halogenated alkanes, and mixtures thereof 22. The method of claim 20, wherein the solvent is selected from the group consisting of benzene, toluene, dimethylbenzenes, trimethylbenzenes, diphenyl ether, tetrahydrofuran, dioxanes, dichloromethane, trichloromethane, 1,2-dichloroethane, anisole, and mixtures thereof.

23. A method of preparing a polycaprolactone, comprising: polymerizing ϵ-caprolactone in the presence of a catalytic amount of a catalyst consisting of bis(cyclopentadienyl)zirconium(IV) chloride hydride.

* * * * *